(12) United States Patent
Potts

(10) Patent No.: US 7,039,168 B1
(45) Date of Patent: May 2, 2006

(54) SYSTEM AND METHOD FOR INVENTORY OF AND ACCESS TO RECORDED ANNOUNCEMENTS

(75) Inventor: Karl W. Potts, Birmingham, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 384 days.

(21) Appl. No.: 10/094,619

(22) Filed: Mar. 12, 2002

(51) Int. Cl.
*H04M 1/64* (2006.01)
*G05B 19/42* (2006.01)

(52) U.S. Cl. .............................. 379/88.25; 379/88.22; 700/88

(58) Field of Classification Search .. 379/88.22–88.25, 379/88.17, 88.28, 88.18; 700/94, 88; 704/275
See application file for complete search history.

(56) References Cited

U.S. PATENT DOCUMENTS

| | | | | |
|---|---|---|---|---|
| 5,832,062 A | * | 11/1998 | Drake ...................... | 379/88.16 |
| 6,035,018 A | * | 3/2000 | Kaufman .................. | 379/88.17 |
| 6,215,858 B1 | * | 4/2001 | Bartholomew et al. .. | 379/88.17 |
| 6,266,399 B1 | * | 7/2001 | Weller et al. ............ | 379/88.19 |
| 6,351,679 B1 | * | 2/2002 | Ainslie ........................ | 700/94 |
| 6,385,305 B1 | * | 5/2002 | Gerszberg et al. ........ | 379/88.13 |
| 6,411,955 B1 | * | 6/2002 | Eads ........................... | 707/10 |
| 6,631,181 B1 | * | 10/2003 | Bates et al. .............. | 379/88.18 |

\* cited by examiner

*Primary Examiner*—Fan Tsang
*Assistant Examiner*—Joseph T Phan
(74) *Attorney, Agent, or Firm*—Withers & Keys, LLC

(57) ABSTRACT

A system and method for providing an inventory of and access to recorded announcement data, the method involving collecting switch data from one or more central office switches of a telecommunications network, extracting recorded announcement data from the switch data, storing the recorded announcement data in a database, and providing one or more users with access to the database through a computer network. The one or more central office switches could be non-incorporated switches or incorporated switches, depending on their ability to store switch data. For non-incorporated switches, which do not store a significant amount of information, the switch data is collected by hand from paper or electronic records and is entered into the database. For incorporated switches, which do store a significant amount of information, the switch data is downloaded from the switch as, for example, translation tables.

18 Claims, 19 Drawing Sheets

| TABLE | FIELD 1 | FIELD 2 | FIELD 3 | FIELD 4 | FIELD 5 | FIELD 6 | FIELD 7 | FIELD 8 | FIELD 9 | FIELD 10 | FIELD 11 | FIELD 12 |
|---|---|---|---|---|---|---|---|---|---|---|---|---|
| ANNMEMS | ANNMEM | HDWTYPE | CARD | MEMINFO | | | | | | | | |
| ANNS | CLLI | ANNTYPE | TRAFSNO | MAXCONN | CYTIME | MAXCYC | | | | | | |
| CLLI | CLLI | ADNUM | TRKGRSIZ | ADMININF | | | | | | | | |
| DNROUTE | AREACODE | OFCCODE | STNCODE | DNRESULT | | | | | | | | |
| DRAMS | DRAMCARD | TMTYPE | TMNO | TMCKT | CARDCODE | CARDINFO | | | | | | |
| DRAMTRK | ANNTRACK | PHSLIST | | | | | | | | | | |
| DRAMUSERS | USERANN | PHSLIST | | | | | | | | | | |
| OFRT | RTE | RTELIST | | | | | | | | | | |
| TMINV | TMNM | FRTYPE | FRNO | SHPOS | FLOOR | ROW | FRPOS | LKDATA | EQPEC | LOAD | EXECS | SCTMLOC |
| TRKNAME | ADNUM | CLLI | | | | | | | | | | |
| | | | | | | | | | | | | |
| DRAMREC | CARD | SPACE | PHRASE EXT | PHRASE INT | LENGTH | | | | | | | |

FIG. 3A

CENTRAL OFFICE XYZ

| TABLE | FIELD 1 | FIELD 2 | FIELD 3 | FIELD 4 | FIELD 5 | FIELD 6 |
|---|---|---|---|---|---|---|
| ANNMEMS | ANNMEM | HDWTYPE | MEMINFO | | | |
| ANNS | CLLI | ANNTYP | MAXCONN | MAXCYG | | MAXCYC |
| CLLI | CLLI | ADNUM | ADMININF | | | |
| DNROUTE | AREACODE | OFCCODE | DNRESULT | | | |
| DRAMS | DRAMCARD | TMTYPE | TMNO | TMCKT | | |
| DRAMTRK | ANNTRACK | PHSLIST | | | | |
| DRMUSERS | USERANN | PHSLIST | | | | |
| OFRT | RTE | RTELIST | | | | |
| OFR2 | RTE | RTELIST | | | | |
| OFR3 | RTE | RTELIST | | | | |
| OFR4 | RTE | RTELIST | | | | |
| TMINV | TMNM | FRTYPE | FRNO | SHPOS | | |
| TRKNAME | ADNUM | CLLI | | | | |
| | | | | | | |
| DRAMREC | CARD | SPACE | PHRASE_EXT | PHRASE_INT | LENGTH | |
| | | | | | CARDCODE | CARDINFO |

FIG. 3C

| TABLE | FIELDS | | | | | |
|---|---|---|---|---|---|---|
| DMS TM CHNL | STD_ABBRV | TRUNK_MOD | CHNL | TM TYPE | MEMBER | |
| DMS MAXCONN | STD_ABBRV | ANNCTYPE | TRKS_OR_MAX_CONN | MAC_CYC | | |
| MDS DRAMTRK | STD_ABBRV | LIST_NUM | TRACK | | | |
| DMS DNROUTE | OFRT | TESTNUM | CLLI | | | |
| DMS DRAMCARD | FRAME_DRAM_NUM | TMNO | TMCKT | TOC_OR_CARD_TYPE | TMTYPE | POWER |
| DMS DRMUSERS | STD_ABBRV | USERANN | LIST_NUM | | | |
| DMS OFRT | OFRT | STD_ABBRV | CLLI | | | |
| DMS TME | TME | M | SHELF | MTM_FOR_DTM | CARD_POS | TYPE |
| DMS TGN | STD_ABBRV | TGN | CLLI | | | |
| DMS ANNOUNCEMENTS | CHNL_ANNOUNC_NUM | CLLI | FRAME_DRAM_NUM | LIST_NUM | SEC_USED | TRKS_OR_MAX_CONN |

FIG. 3D

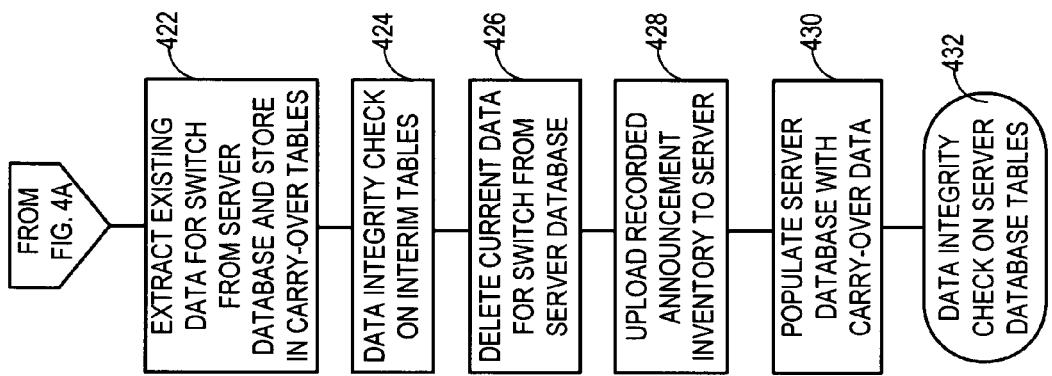

| | CLLI | SwType | FrType | RA Unit | FrLoc | ChnQty | Wkg | Sec/Chnl | DueDate | Stat | Updated | CardUse |
|---|---|---|---|---|---|---|---|---|---|---|---|---|
| 1 | BWLGKYMADSO | SE | 15A | 000 | ? | 8 | 6 | 60 | | | 03-03-2000 | |
| 2 | BWLGKYMADSO | SE | 15A | 001 | ? | 8 | 1 | 60 | | | 07-15-1999 | |
| 3 | BWLGKYMADSO | SE | 15A | 002 | ? | 8 | 1 | 60 | | | 07-15-1999 | |
| 4 | BWLGKYMADSO | SE | 15A | 003 | ? | 8 | 6 | 60 | | | 07-15-1999 | |
| 5 | BWLGKYMADSO | SE | COOK | 004 | ? | 4 | 4 | 60 | | | 7/6/99 | |
| 6 | BWLGKYMADSO | SE | 15A | 005 | ? | 8 | 2 | 60 | | | 03-03-2000 | |
| 7 | BWLGKYMADSO | SE | 15A | 006 | ? | 8 | 0 | 60 | | | 10-15-1999 | |

FIG. 8A

Recorder Announcements

| | CLLI | SwType | FrType | RA Unit | FrLoc | ChnQty | Wkg | Sec/Chnl | Sec/Card | DueDate | Stat | Updated | CardUse |
|---|---|---|---|---|---|---|---|---|---|---|---|---|
| 1 | BWLGKYMADSO | SE | 15A | 000 | ? | 8 | 6 | 60 | | | | 03-03-2000 | |
| 2 | BWLGKYMADSO | SE | 15A | 001 | ? | 8 | 1 | 60 | | | | 07-15-1999 | |
| 3 | BWLGKYMADSO | SE | 15A | 002 | ? | 8 | 1 | 60 | | | | 07-15-1999 | |
| 4 | BWLGKYMADSO | SE | 15A | 003 | ? | 4 | 6 | 60 | | | | 7/6/99 | |
| 5 | BWLGKYMADSO | SE | COOK | 004 | ? | 8 | 4 | 60 | | | | 03-03-2000 | |
| 6 | BWLGKYMADSO | SE | 15A | 005 | ? | 8 | 2 | 60 | | | | | |
| 7 | BWLGKYMADSO | SE | 15A | 006 | ? | 8 | 0 | 60 | | | | 10-15-1999 | |

| | List # | StdAbbrv | Sec's | MaxCalls | TGN | TMN | TOC | EqptCode | RtIndex | TestNum | B/I | XA Code | Upo |
|---|---|---|---|---|---|---|---|---|---|---|---|---|---|
| 0 | 301 | TSNOTAL | 8.0 | 0 | 227 | | SN104 | | 358 | | | XA210648 | 7/6/99 |
| 1 | 302 | TSCPBSY | 7.0 | 0 | 229 | | SN104 | | 360 | | | XA210650 | 7/6/99 |
| 2 | 306 | TSSDEAC | 4.8 | 0 | 228 | | SN104 | | 359 | | | XA210649 | 7/6/99 |
| 3 | 308 | TSCRCON | 11.0 | 0 | 226 | | SN104 | | 357 | | | XA210647 | 7/6/99 |
| 4 | 310 | TSCTCON | 8.5 | 0 | 224 | | | | 356 | | | XA210645 | 7/6/99 |
| 5 | | | | | | | | | | | | | |
| 6 | | | | | | | | | | | | | |
| 7 | 332 | CWD Reminder | 7.0 | 0 | 009 | | SN104 | | 615 | | | XA213980 | 7/6/99 |

FIG. 8B

Recorded Announcements in CENTRAL OFFICE NUMBER 23

| DRAM.Card | Type | TME | TM | CardType | Capacity | Working | Annc | Phrase ID | Annc CLLI | Lenght | TGN | Ckt | OFRT | TestNum | Cyc |
|---|---|---|---|---|---|---|---|---|---|---|---|---|---|---|---|
| 000.001 | DRAM | 2 | 8 | 1X76 | 31 | 31 | 0 | PROM | ENG1 | 1 | - | - | - | - | - |
| 000.001 | DRAM | 2 | 8 | 1X76 | 31 | 31 | 1 | PROM | ENG2 | 1 | - | - | - | - | - |
| 000.001 | DRAM | 2 | 8 | 1X76 | 31 | 31 | 2 | PROM | ENG3 | 1 | - | - | - | - | - |
| 000.001 | DRAM | 2 | 8 | 1X76 | 31 | 31 | 3 | PROM | ENG4 | 1 | - | - | - | - | - |
| 000.001 | DRAM | 2 | 8 | 1X76 | 31 | 31 | 4 | PROM | ENG5 | 1 | - | - | - | - | - |
| 000.001 | DRAM | 2 | 8 | 1X76 | 31 | 31 | 5 | PROM | ENG6 | 1 | - | - | - | - | - |
| 000.001 | DRAM | 2 | 8 | 1X76 | 31 | 31 | 6 | PROM | ENG7 | 1 | - | - | - | - | - |
| 000.001 | DRAM | 2 | 8 | 1X76 | 31 | 31 | 7 | PROM | ENG8 | 1 | - | - | - | - | - |
| 000.001 | DRAM | 2 | 8 | 1X76 | 31 | 31 | 8 | PROM | ENG9 | 1 | - | - | - | - | - |
| 000.001 | DRAM | 2 | 8 | 1X76 | 31 | 31 | 9 | PROM | ENG0 | 1 | - | - | - | - | - |
| 000.001 | DRAM | 2 | 8 | 1X76 | 31 | 31 | 10 | PROM | DSCWWAIT_324 | 1 | 244 | - | 600 | 205-620-1992 | 1 |
| 000.001 | DRAM | 2 | 8 | 1X76 | 31 | 31 | 11 | PROM | NCA | 9 | 77 | 16 | 203 | 205-20-1960 | 2 |
| 000.001 | DRAM | 2 | 8 | 1X76 | 31 | 31 | 12 | PROM | ROHAN | 12 | 80 | 20 | 208 | 205-664-4921 | 2 |
| 000.001 | DRAM | 2 | 8 | 1X76 | 31 | 31 | 13 | PROM | VCA | 9 | 79 | 23 | 204 | 205-668-9876 | 2 |
| 000.001 | DRAM | 2 | 8 | 1X76 | 31 | 31 | 14 | PROM | BLDNAN | 7 | 81 | 3 | 201 | 205-620-1964 | 2 |
| 000.002 | DRAM | 2 | 8 | 1X77 | 31 | 30 | 0 | L91 | PARTDIAL | 8 | 87 | 18 | 221 | - | 2 |
| 000.002 | DRAM | 2 | 8 | 1X77 | 31 | 30 | 1 | L40 | VCA | 8 | 79 | 23 | 204 | 205-668-9876 | 2 |
| 000.002 | DRAM | 2 | 8 | 1X77 | 31 | 30 | 2 | L61 | CKTBY | 8 | 93 | 6 | 700 | - | 2 |
| 000.002 | DRAM | 2 | 8 | 1X77 | 31 | 30 | 3 | DEACTANN_306 | CLASS | 6 | 250 | - | 410 | - | 1 |
| 000.003 | DRAM | 2 | 8 | 1X77 | 31 | 31 | 0 | L225 | CNLSPUBAN | 10 | 78 | 7 | 209 | 205-620-1961 | 2 |

FIG. 9C

| LIST # | STD ABBRV | LENGHT | USOC | WORDING |
|---|---|---|---|---|
| 001 | BLKNANN | 10.8 | TSTA1 | WE'RE SORRY; YOU HAVE REACHED A NUMBER THAT HAS BEEN DISCONNECTED OR IS NO LONGER IN SERVICE. IF YOU FEEL YOU HAVE REACHED THIS RECORDING IN ERROR, PLEASE CHECK THE NUMBER AND TRY YOUR CALL AGAIN. |
| 003 | ? | 7 | - | WE'RE SORRY; THE TELEPHONE YU ARE CALLING FROM IS NOT IN SERVICE AT THIS TIME. |
| 030 | CENTNWS | 10 | TSTAL | WE'RE SORRY, THE NUMBER YOU HAVE REACHED IS NOT IN SERVICE. IF YOU ARE CALLING (ABC CO.) PLEASE DIAL (XXX-XXXX) |
| 030A | HVNUMCH | 0 | TSTED | WE'RE SORRY, THE TELEPHONE NUMBER AT THE (ABC CO.) HAS BEEN CHANGED. FOR THEIR NEW NUMBER, PLEASE DIAL (xxx-xxxx) |
| 040 | VCDENXX | 9.5 | TSTCC | WE'RE SORRY; YOUR CALL CANNOT BE COMPLETED AS DIALED. PLEASE CHECK THE NUMBER AND DIAL AGAIN. |
| 042 | NONW911 | 9.5 | TSTBI | 911 IS NOT A WORKING NUMBER FOR YOUR AREA. FOR EMERGENCIES, HANG UP AND DIAL YOUR OPERATOR. |
| 060 | NPA SPLIT 901 731 | 14 | - | THIS LOCAL CALL NOW REQUIRES THE AREA CODE PLUS THE SEVEN DIGIT NUMBER YOU ARE CALLING. PLEASE REDIAL WITH THE AREA CODE. THE FOLLOWING ARE ONES FOR THE HEARING IMPAIED. |
| 061 | NOCKBOK | 8 | TSTBG | WE'RE SORRY; ALL CIRCUIT ARE BUSY NOW. WILL YOU PLEASE TRY YOUR CALL AGAIN LATER. |
| 063 | EMANTRB | 9.5 | TSTAZ | WE'RE SORRY; DUE TO TELEPHONE COMPANY FACILITY TROUBLE, YOUR CALL CANNOT BE COMPLETED AT THIS TIME. WILL YOU TRY YOUR CALL AGAIN LATER. |
| 065 | EMER3AN | 9 | TSTBB | WE'RE SORRY; DUE O HEAVY CALLING WE CANNOT COMPLETE YOUR CALL AT THIS TIME. WILL YU PLEASE HANG UP AND TRY YOUR CALL AGAIN LATER. |
| 066 | EMER4AN | 11.5 | TSTBC | WE'RE SORRY; DUE TO HEAVY CALLING THE OPERATOR WILL BE DELAYED IN ASSISTING YOU. IF YOUR CALL IS URGENT, STAY ON THE LINE AND AN OPERATOR WILL ANSWER AS |

FIG. 9D

Recorder Announcements

Enter Notice ID: 2058 — 1000

| CLLI | SwType | FrameType | DRAM.Cd | TIME | TM | DTM | CardType |
|---|---|---|---|---|---|---|---|
| WPBHFLGRDSO | DMS1/2 | EDRAM | 009.004 — 1002 | 14 | 2 | 52 | 1X80 |

1004 ↓    1006 →

| DRAM.Cd | Annc# | PhraseID | Annc CLLI | Sec's | MaxCo | TGN | Ckt | OFRT | TestNum | B/I | XA CODE | Updated |
|---|---|---|---|---|---|---|---|---|---|---|---|---|
| 009.004 | 0 | L386 | AIN_ANNC_136 | 14.0 | 21 | 808 | 5.7 | | | B | XA216370 | 02-23-2001 |
| 009.004 | 1 | L387 | AIN_ANNC_137 | 3.0 | 10 | 811 | 8.9 | | | B | XA216371 | 02-23-2001 |
| 009.004 | 2 | L389 | AIN_ANNC_139 | 11.0 | 21 | 810 | 10.12 | | | B | XA216372 | 02-23-2001 |
| 009.005 | 0 | L390 | AIN_ANNC_140 | 10.0 | 16 | 811 | 15.16 | | | B | XA216373 | 02-23-2001 |
| 009.005 | 1 | L391 | AIN_ANNC_141 | 9.0 | 16 | 812 | 17.18 | | | B | XA216374 | 02-23-2001 |
| 009.005 | 2 | L392 | AIN_ANNC_142 | 4.0 | 10 | 813 | 19.20 | | | B | XA216375 | 02-23-2001 |
| 009.005 | 3 | L393 | AIN_ANNC_143 | 8.0 | 16 | 814 | 13.14 | | | B | XA216376 | 02-23-2001 |
| 009.006 | 0 | L394 | AIN_ANNC_144 | 4.0 | 0 | 815 | 21.22 | | | B | XA216377 | 02-23-2001 |
| 012.004 | 0 | L380 | AIN_ANNC_130 | 8.0 | 16 | 800 | 3.4 | | | | XA216362 | 02-23-2001 |
| 012.004 | 1 | L381 | AIN_ANNC_131 | 13.0 | 21 | 801 | 5.6 | | | | XA216363 | 02-23-2001 |
| 012.004 | 2 | L382 | AIN_ANNC_132 | 4.0 | 10 | 802 | 7.8 | | | | XA216364 | 02-23-2001 |
| 012.004 | 3 | L383 | AIN_ANNC_133 | 6.0 | 16 | 803 | 9.10 | | | | XA216365 | 02-23-2001 |
| 012.005 | 0 | L384 | AIN_ANNC_134 | 5.0 | 10 | 804 | 11.12 | | | B | XA216366 | 02-23-2001 |
| 012.005 | 1 | L385 | AIN_ANNC_135 | 14. | 21 | 805 | 13.14 | | | B | XA216367 | 02-23-2001 |
| 012.005 | 2 | L388 | AIN_ANNC_138 | 3.0 | 1 | 806 | 15.22 | | | I | XA216368 | 02-23-2001 |
| 012.005 | 3 | L395 | AIN_ANNC_145 | 3.0 | 1 | 807 | 23.29 | | | I | XA216369 | 02-23-2001 |

FIG. 10

SYSTEM AND METHOD FOR INVENTORY OF AND ACCESS TO RECORDED ANNOUNCEMENTS

FIELD OF THE INVENTION

The present invention relates to recorded announcements communicated over a network used by a telephone service provider or a business, such as an airline, financial services institution, travel agency, or polling service. More particularly, the present invention relates to a system and method for inventorying and accessing recorded announcement information via a network.

BACKGROUND OF THE INVENTION

Numerous businesses use recorded announcements to convey information to their customers via a communications network. The use of recorded announcements is widespread and rapidly growing in today's global economy. For example, most, if not all, telecommunication companies use hundreds of recorded announcements to notify callers of call status, service status, available services, employment opportunities, account balances and the like. Similarly, banking services use thousands of recorded announcements to inform customers of, for example, account status, lending opportunities, payment options, credit rates, billings and various other services. Most establishments use recorded announcements to route calls, receive automated purchase information, generate sales, perform sales promotions and provide other automated customer services. Polling services use recorded announcements to respond to calls, issue questions to callers and generate responses to data input by callers. Hospitals, governmental agencies, and other large entities often employ recorded announcements both internally and externally for applications with callers. As yet another example, many airline services use hundreds of recorded announcements to inform passengers of flight status, ticket information, and the like. The travel services industry is another business sector that utilizes systems with recorded announcements. Most travel agencies, car rental services, hotels and the like handle transactions with recorded announcements. Many companies use "in-house" communication systems with "pick up" phones that play announcements when a user picks up the telephone (e.g., a car rental agency, hotel or the like, with a "pick up" telephone at a front desk or reception counter).

Most telecommunication systems employ one or more central offices (CO) on a network. Typically, each central office has recorded announcement equipment coupled to a switch network via a series of trunks. A trigger in the network is used to identify which recorded announcement(s) is (are) required for a communication on the network. The switch network routes incoming calls to a trunk. Each trunk is associated with one or more recorded announcements on the recorded announcement equipment. With existing systems and methods, recorded announcements are loaded on the recorded announcement equipment according to the needs of each central office. In most cases, at least a portion of the announcements that are available at one central office is common to two or more central offices on a network. For example, the announcements for a particular central office may be common to all of the telephone subscribers serviced on a local access transport area (LATA).

Currently, when new recorded announcements become available, or existing recorded announcements require maintenance and the like, work assignments must be made to update announcements in one or more of the central offices that use those announcements. When this occurs, using known systems, an announcement tape must be loaded in each central office. This arrangement is often time consuming and costly. For example, maintaining recorded announcements at numerous locations imposes significant labor efforts to assign and maintain announcements in each central office.

FIG. 1 is a schematic illustration of an exemplary architecture of known systems. In this example, subscribers of a telephone service provider access specific recorded announcements coupled to trunks in a central office 100. For example, caller 101 dials a code, e.g., "1+" or "800", that causes a trigger in router 110 or alternatively in the central office 100, to initiate a query for a recorded announcement from recorded announcement equipment 150. Similarly, another caller 102 dials a defined service number, and router 110, recognizing this number, routes the call to an automated attendant function at central office 100. Finally, based on a sudden service outage for cellular calls in a certain region, cellular telephone caller 103 is identified as a cellular call by the network and routed to central office 100 via mobile telephone switching office (MTSO) 120 to receive service information, i.e., recorded announcements concerning the sudden service outage.

Thus, users (e.g., 101, 102, 103 . . . n) are connected to a central office 100 through a router 110, a distributing frame 115 and into a switch network 130. In this example, user 101 has dialed a number that requires a recorded announcement from the central office 100. A processor (not shown) recognizes that a user 101 requires a recorded announcement and connects the line through the switch network 130 to a trunk circuit 140 that is in communication with recorded announcement equipment 150. In most arrangements, the recorded announcement equipment is coupled directly to the switch. Typically, this architecture is repeated in one or more central offices throughout a network. Of course, the number and sizes of the central offices will vary, depending upon the size of the overall system, and other considerations.

Under most current situations, recorded announcements are loaded on recorded announcement equipment 150 by the use of a standard conventional audiocassette tapes 153. In some instances, recorded announcements are loaded onto, for example, a lap top personal computer (or a local workstation) 157 and then loaded onto recorded announcement equipment 150 via a cable or other link 155.

Typically, for each recorded announcement there is an assigned trunk, or a path, to switch network 130. This configuration varies somewhat from one switch type to another. However, in the simplest terms, each announcement requires a trunk or path from the recorded announcement equipment 150 to the switch network 130. In switching systems such as the Lucent 1AESS™ and 5ESS™ switches, for example, most of the recorded announcement equipment interfaces with the switch network via an analog trunk circuit. The recorded announcement equipment in these switching systems has a channel for each announcement. This means that each channel is wired to a trunk circuit that also connects to the switch network. Accordingly, when an announcement must be added or changed at a central office, it is first loaded on the recorded announcement equipment 150 and then a trunk is wired into the switch network. The latest vintage of recorded announcement equipment that is used in 5ESS™ switching systems uses a 24-channel T-carrier interface. In this arrangement, all 24 channels of each recorded announcement unit are wired to a T-carrier system that then connects to the switch network. No additional wiring of channels is needed at the time when announcements are added or changed. However, these systems require loading of the announcements and occasional maintenance.

Typically, in each central office, or perhaps in one location for a group of central offices, sets of tapes are maintained so that if for some reason one or more of the announcements becomes corrupted, announcements can be re-recorded from the tape(s) onto the recording announcement equipment 150. Similarly, when new services are added that involve recorded announcements, new tapes are made and delivered to the respective central offices so that they can be loaded onto the appropriate equipment at those central offices.

The recorded announcement equipment in Nortel Networks DMS™ and Siemens EWSD™ switching systems is similar to the latest vintage in 5ESS™ systems in that the equipment connects to the switching network via a multichannel link. No additional wiring is needed in the DMS™ and EWSD™ switching systems after the equipment is installed. However, these systems also require loading of the announcements and occasional maintenance.

Accordingly, using known systems, inventories of recorded announcements must be maintained for one or more central offices. Furthermore, care must be maintained to ensure consistency of the recorded announcements at all central offices. Another problem is that it is difficult to match recording levels across multiple devices at multiple central offices.

Accordingly, a need exists for a system and a method for requesting, provisioning, and maintaining recorded announcements and related equipment for one or more central offices.

In addition, most telecommunication systems employ multiple central offices, which have recorded-announcement equipment located at one or more central office switches. Recorded announcements are loaded on the equipment according to the needs of each central office. The number of announcements is often very large and capacity is often an issue. Accordingly, a need also exists to assemble data concerning the recorded announcement equipment at the various central offices and to provide access to the data. A further need exists to allow for the monitoring of available capacity at the central offices.

SUMMARY OF THE INVENTION

The present invention includes a system and method for managing recorded announcements and making them remotely available through a network, e.g., via an Intranet or Internet web site. Preferably, a web site allows users to access, manipulate, download, and sample recorded announcement inventories by central office(s), state, switch type, local access transport area (LATA), and/or region. Certain embodiments of the invention include an interface to provide means for interacting with an announcement database, for alerting appropriate entities to the need for more recorded announcement equipment, and for allowing the identification of available recorded announcement capacity.

According to an embodiment of the present invention, a method for managing recorded announcement data involves collecting switch data from one or more central office switches of a telecommunications network, extracting recorded announcement data from the switch data, storing the recorded announcement data in a database, and providing one or more users with access to the database through a computer network. The one or more central office switches could be switches with non-incorporated recorded announcement equipment or switches with incorporated recorded announcement equipment, which impacts how much information regarding recorded announcement information is stored in the switch data. For non-incorporated switches, which do not store a significant amount of information about recorded announcement equipment, the switch data is collected by hand from paper or electronic records and is entered into the database. For incorporated switches, which do store a significant amount of information, the switch data is downloaded from the switch as, for example, translation tables.

BRIEF DESCRIPTION OF THE DRAWINGS

FIG. 3A is a table that lists exemplary translation table data fields of a switch, according to an embodiment of the present invention.

FIG. 3C is a table that lists exemplary recorded announcement data fields of a central office switch, as retrieved in FIG. 3B, according to an embodiment of the present invention.

FIG. 3D is a table that lists exemplary recorded announcement data fields for interim tables, according to an embodiment of the present invention.

FIGS. 4A and 4B are flowcharts describing an exemplary process for collecting recorded announcement information from a switch and converting the information to a format that is ready for access by users, according to an embodiment of the present invention.

FIG. 8A is a screen image of an exemplary user interface page that lists office and equipment recorded announcement information, according to an embodiment of the present invention.

FIG. 8B is a screen image of an exemplary user interface page that displays recorded announcement information associated with a selected unit, according to an embodiment of the present invention.

FIG. 9C is a screen image of an exemplary user interface page that displays recorded announcement information for a selected central office, according to an embodiment of the present invention.

FIG. 9D is a screen image of an exemplary user interface page that lists standard recorded announcements by list number and standard abbreviation, and includes exemplary wording for each announcement, according to an embodiment of the present invention.

FIG. 10 is a screen image of an exemplary user interface page that displays announcements associated with a selected Notice ID, according to an embodiment of the present invention.

DETAILED DESCRIPTION OF THE INVENTION

Figure 1:
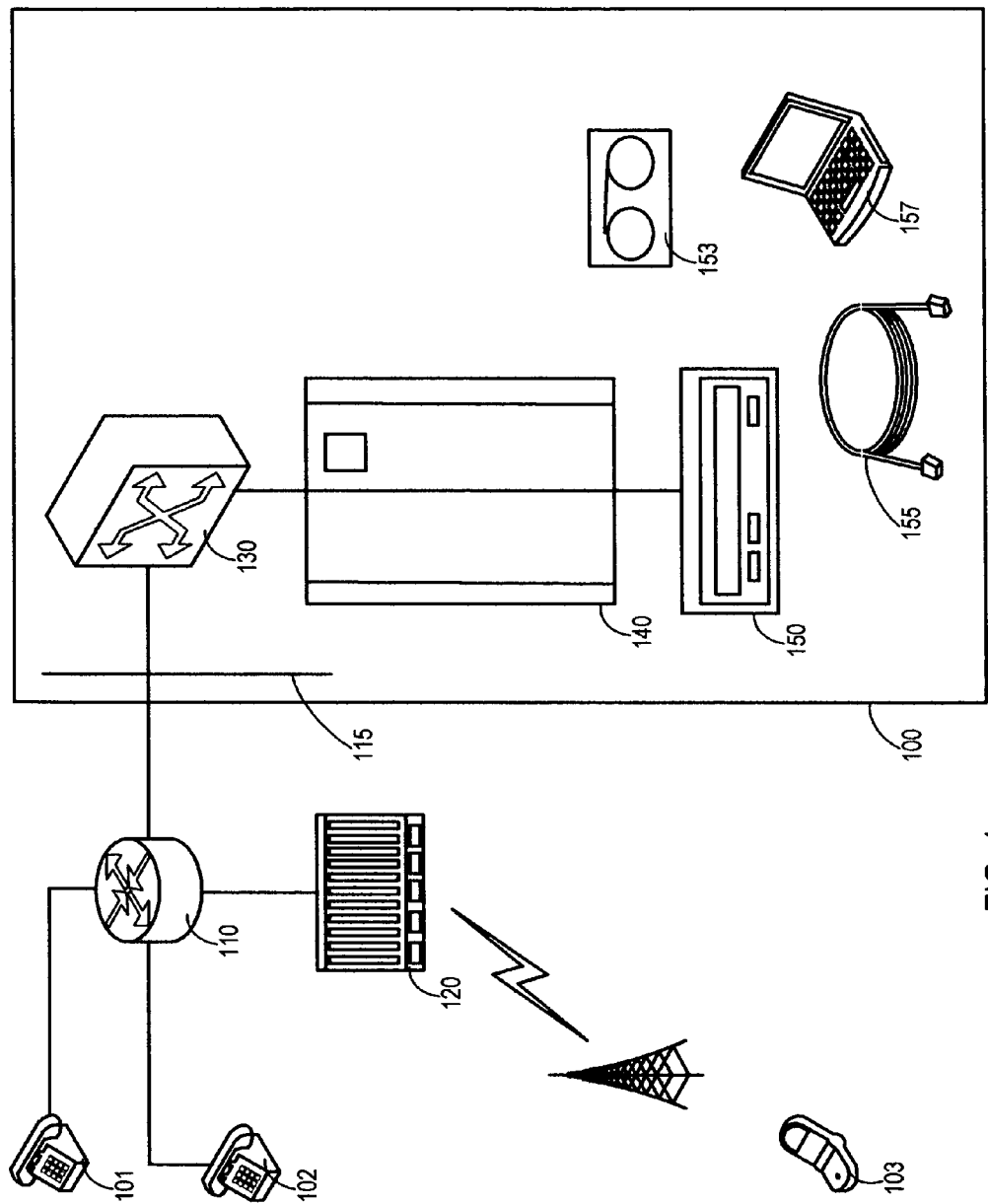
FIG. 1 is a schematic diagram of an overview of a known telecommunication system implementing a known exemplary recorded-announcement architecture.
Figure 2A:
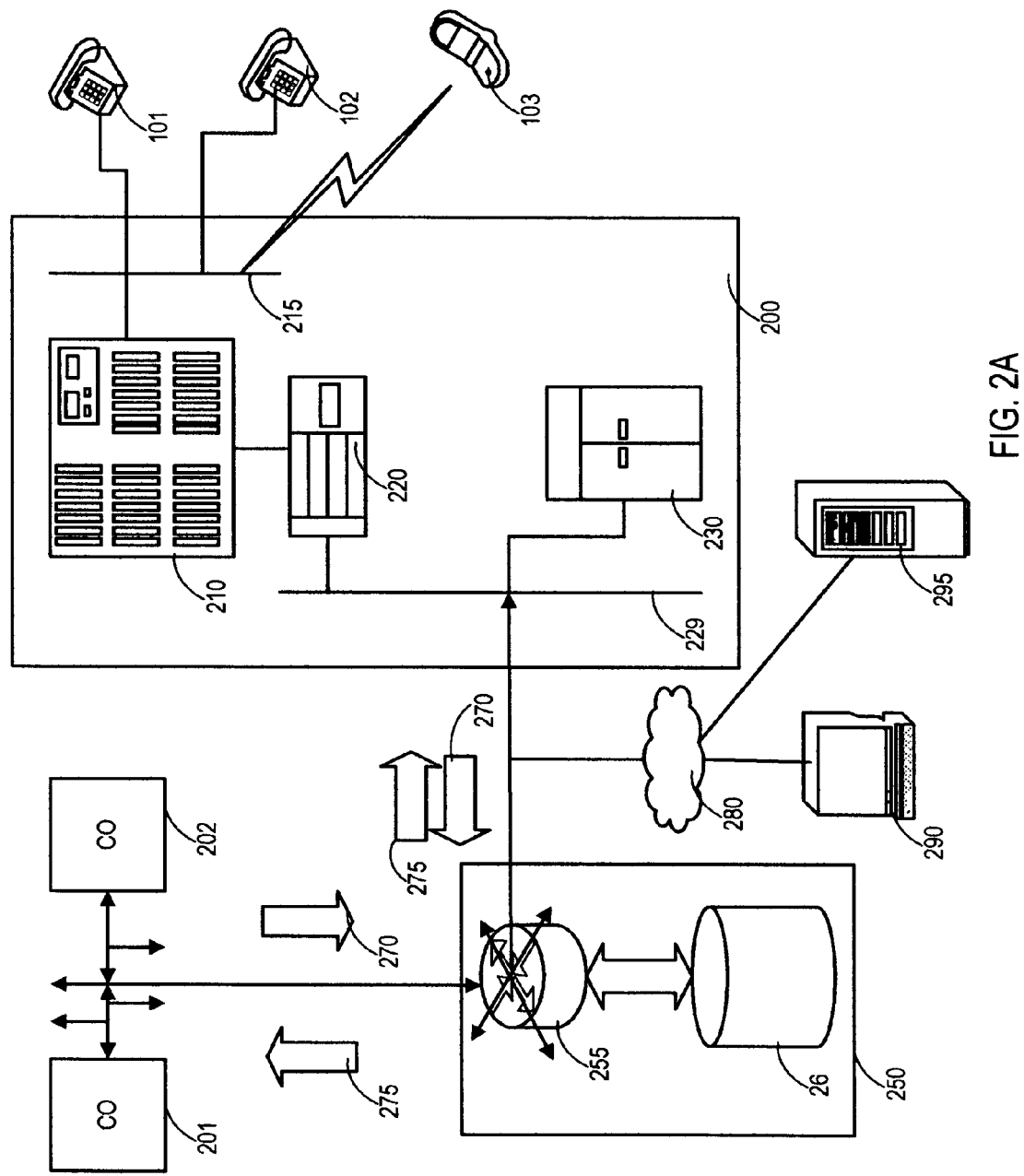
FIG. 2A is a schematic diagram of an overview of an exemplary system architecture according to an embodiment of the present invention.
Figure 2B:
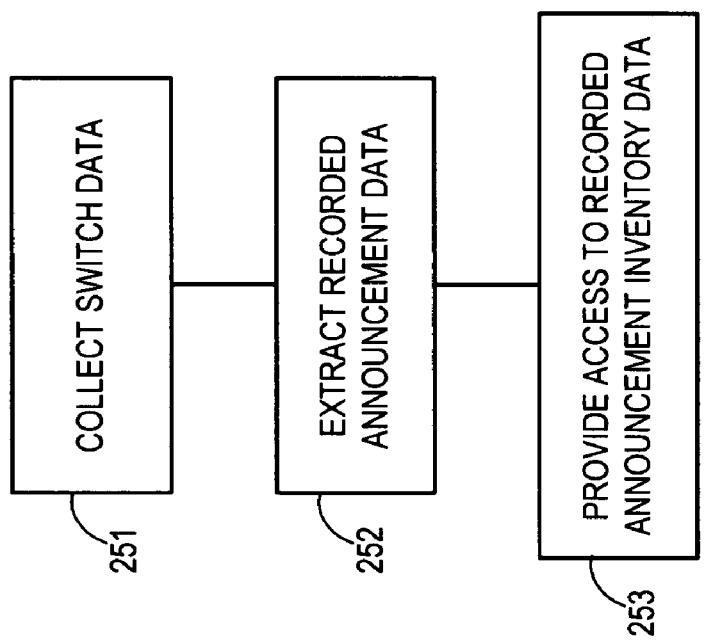
FIG. 2B is a flowchart depicting an overview of an exemplary method for managing recorded announcement data associated with a communications network, according to an embodiment of the present invention.

An exemplary embodiment of the present invention is depicted in FIGS. 2A and 2B. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

FIGS. 2A and 2B illustrate schematically an embodiment of the present invention that provides a system and method for managing the recorded announcement information of a communications network, which includes collecting, inventorying, and providing access to the recorded announcement information. FIG. 2B is a flowchart that provides an overview of the method. FIG. 2A illustrates an exemplary network architecture on which the method of FIG. 2B operates.

The present invention operates on an announcement network that provides a centralized recorded announcement data schema. The network could, for example, use one or more announcement service nodes to provide recorded announcements to one or more central offices on a network. An example of such a network is described in the co-pending application Ser. No. 10/073,238, titled "System and Method for Providing Recorded Messages on a Communications Network," filed Feb. 13, 2002, which is assigned to the assignees of the present invention and is hereby incorporated by reference in its entirety.

The system architecture of FIG. 2A uses one or more announcement service nodes to provide recorded announcements to one or more central offices on a network. In a preferred embodiment, a processor at a central office or the like sends a query to one or more service nodes to retrieve an appropriate announcement in response to a received call. According to one embodiment of the present invention, at least one service node is provided for each local access transport area (LATA).

In this architecture, most or all recorded announcements are stored at centralized locations, thus reducing the effort required in assigning, managing, and maintaining announcements. For example, according to embodiments of the invention, if a central office needs a new recorded announcement, nothing needs to be done except perhaps a translation change.

According to one exemplary embodiment, a new announcement is loaded at a centralized location. Logic in software at the centralized location determines, according to events in call processing, when the new announcement needs to be delivered to one or more central offices. In some situations in which the new announcement is needed only at one or a few central offices, translation changes may be needed. A translation change is a software entry in the program in the main processor that controls the operation of the switching system. A translation change would include information regarding the new announcement, such as the situation that requires the announcement, and the message to send requesting the announcement from the centralized location. Implementing a translation is a relatively simple operation and can be administered from a location remote to the central office.

Embodiments of the invention employ a centralized database designed to provide a source of recorded announcements accessible by users and, preferably, updateable by one or more administrative entities.

Referring to FIG. 2A, customers (e.g., 101, 102, 103 . . . n) (e.g., subscribers to a telephone service provider, Intranet clients, or employees of a company) are connected to a central office 200 via distributing frame 215 into a switch network 210. Central office 200 is connected to one or more trunks 220 and a frame 229 that includes an announcement digital signal processor 230. In turn, central office 200 is coupled to an announcement service node 250. Central office 200 serves as one central office on a LATA. Central offices 201, 202 are also part of the LATA and are coupled to service node 250.

Announcement service node 250 comprises a router 255 and one or more databases 260. Database 260 may be in the format of a relational database (e.g., Oracle™ databases), Lightweight Directory Access Protocol (LDAP), or other known data storage architectures. In this example, when a device 101 initiates a call on the network, a processor (not shown), for example, initiates a query 270 to announcement service node 250 with a request that indicates a particular call scenario. For example, the processor may be located on or next to switch 210, communicating with service node 250 via trunk 220. The routing is determined by whatever the trigger (not shown) requests. In the preferred mode, service node 250 interprets the query and decides what announcement(s) is (are) needed. Service node 250 then sends the needed announcements back in packet-size form 270, for example, to the central office 200. An announcement digital signal processor 230 takes the packet-size file (or signal) and converts it into a voice file and connects it to the switch network 210 via a trunk circuit 220. The switch network 210 routes the recorded announcement to customer 101. Of course, the announcement may be delivered to a voice file, subscriber, customer, or other network application. Callers 102 and 103 are routed to announcements in a similar manner.

As shown in FIG. 2A, multiple central offices 201, 202 can be connected to service node 250. Preferably, each central office initiates requests 270 for announcements 275 from announcement service node 250. At the physical layer, a number of protocols for the requests (queries) are applicable, including X.25, DS0, and DS1. The transport of announcements from database 260 to a central office can involve the use of compression techniques such as Pulse Coded Modulation (PCM) or Adaptive Differential PCM (ADPCM) to conserve capacity.

According to one embodiment, a central office 200 provides a service node 250 with a customer identification code, e.g., a phone number, Dialed Number Identification Service (DNIS), Automatic Number Identification (ANI), or other identification means, and service node 250 provides central office 200 with a customer identification file. The file may contain a name or other information related to the customer, including one or more personalized recorded announcements. In this manner, each service node can store personalized recorded announcements for a caller 101. For example, a telephone service provider could offer a service in which a subscriber can record personal greetings for specific callers to that subscriber's home or business telephone (e.g., the message "Happy Birthday" to the caller with a particular telephone number).

As shown in FIG. 2A, announcement service node 250 can access one or more databases 260. Of course, database 260 can be one or more databases in one or more locations. Service node 250 may access files using a number of established means, including Btrieve™, ODBC (Open Data-Base Compliant) implementations such as Remote Data Objects and ActiveX™ Data Objects, or other structured query language (SQL) methods.

Local workstation 290 accesses announcement service node 250 via a network application 280 to remotely access, inventory, and maintain recorded announcements that are stored in database 260. Network application 280 is, for example, an Intranet or Internet application. Network application 280 and local workstation 290 enable a user to access recorded announcement information for a particular central office. Local workstation 290 can collect the recorded announcement information of multiple central offices, and store the information on workstation 290 or on a separated database server 295 (with which workstation 290 is in communication through network 280).

Based on the exemplary system architecture of FIG. 2A, the method of the present invention operates as follows. As shown in FIG. 2B, the method begins in step 251 by collecting switch data from each central office of the network. Thus, for example, in the network of FIG. 2A, inventory information would be collected from the switches of central offices 200, 201, and 202, such as switch 210 of central office 200. The collected switch data is preferably stored in workstation 290, but could be stored in database 260 or in another computer or server in communication with network 280, such as server 295.

After compiling this inventory information, the process continues in step 252 by extracting recorded announcement data from the switch data and formatting the recorded announcement data for access by users who assign and maintain recorded announcements. The extracted recorded announcement data preferably includes only necessary information, leaving out any extraneous data related to the central office (e.g., extraneous information that may be stored on the switch of the central office). At the conclusion of step 252, the recorded announcement inventory information is stored in a formatted database. The formatted database is stored, for example, in database server 295 or in another computer or server in communication with network 280.

After the recorded announcement data is stored in the formatted database, the process continues in step 253 by providing users with access to the formatted recorded announcement inventory data. This step could simply involve providing users with the ability to view the formatted database. Preferably, however, to provide this access, the present invention provides a graphical user interface through which users can view, search, and edit the inventory data stored in the formatted database. The users preferably access the information remotely through network 280.

The details of each of the steps 251, 252, and 253 are explained below.

Referring to step 251 of FIG. 2B, the manner by which the switch data is collected depends on the type of switch that a particular central office has. Some switches are configured such that only a limited amount of information about recorded announcement equipment is stored in the switch translation tables. These switches are referred to herein as non-incorporated. Examples of non-incorporated switches include the Lucent 5ESS™ digital switching office system and the Lucent 1AESS™ analog central office switch. With non-incorporated switches, the switch data is collected by hand, from historical paper or electronic records kept in the course of maintaining the switch. Those persons responsible for maintaining the central office, such as central office technicians or managers, would typically possess these records. After collecting these records, the desired inventory data would be typed (in the case of paper records) or loaded (in the case of electronic records) into a database (e.g., database 260, workstation 290, or another database in communication with network 280).

In contrast to non-incorporated switches, other switches are configured such that most or all of the information related to recorded announcement equipment is stored in the switch translation tables. These switches can therefore provide inventory data directly, eliminating the need to collect separate paper or electronic maintenance records. Thus, instead of collecting inventory information by hand, the information can be taken from the switch itself. These types of switches are referred to herein as incorporated switches. An example of an incorporated switch is the Northern Telecom (Nortel) DMS100F™ switch, which contains a database that stores several translation tables. Thus, with incorporated switches, data can be downloaded from the database (e.g., translation tables) of the switch, ready to be pared down and assembled into a second formatted database (step 252 of FIG. 2B).

As would be appreciated by those skilled in the art, an incorporated switch, such as a DMS™ switch, contains a processor that controls the switch network and the peripheral devices, and runs dynamic software. The dynamic software populates the translation tables with information about the switch, including information about recorded announcements. Thus, at any given time, the translation tables of the incorporated switch contain up-to-date information about its recorded announcements.

The tables listed below provide an example of the data typically stored on a DMS™ switch. The tables summarize a data file downloaded from a DMS™ switch in Alabaster, Alabama, which is owned and operated by BellSouth™ of Atlanta, Ga. The data file includes a "Display of DRAM" for each DRAM (Digital Recorder Announcement Module), followed by a series of thirteen translation tables with the following headings: ANNS, ANNMES, CLLI, DRAMS, DRAMTRK, DRMUSERS, TMINV, DNROUTE, OFRT, OFR 2, OFR 3, OFR 4, and TRKNAME. The "Display of DRAM," which is also referred to as DRAMREC, is not a translation table, but contains fields of data that are used in the present invention.

For illustration purposes only, the translation table headings correspond to following definitions:

| | |
|---|---|
| ANNS | Announcements; |
| ANNMEMS | Announcement Member Information (e.g., hardware on which the phrases are loaded); |
| CLLI | Common Language Location Identifier, which is an alphanumeric code used to identify physical locations and equipment such as buildings, central offices, poles, and antennae, and which in the context of the present invention is used to identify a recorded announcement that may be composed of one or more phrases; |
| DRAMS | Digital Recorder Announcement Modules; |
| DRAMTRK | (Announcement) Track of Digital Recorder Announcement Modules; |
| DRMUSERS | Users of Digital Recorder Announcement Modules; |
| TMINV | Trunk Module Inventory; |
| DNROUTE | Directory number to route; |
| OFRT | Office route index, table 1; |
| OFR 2 | Office route index, table 2; |
| OFR 3 | Office route index, table 3; |
| OFR 4 | Office route index, table 4; and |
| TRKNAME | Trunk Group Number or Name (CLLI). |

For brevity, the representative tables below include only the headings and the first few lines of each translation table (except for tables OFR 3 and OFR 4, which are shown complete, but have no data populating them). In reality, the actual translation tables can include long lists of data.

Table 1 provides an example of the data stored in the DMS™ switch under a "Display of DRAM" table for DRAM0. "Display of DRAM" is also referred to as a DRAMREC.

TABLE 1

Display of Dram for DRAM0

```
Display of Dram
0 0 MTM 8 0 1X75BA CTLR DRAM0
CARD 0 CTLR          SPACE: MAX    CONTIG 0 TOTAL 0
CARD 1 PROM          SPACE: MAX    CONTIG 0 TOTAL 0
PHRASE_EXT           PHRASE_INT    LENGTH
ENG1                 48            1
ENG2                 49            1
SILENCE              0             1
NCA                  40            9
ROH                  43            12
VCA                  42            9
VDN                  44            7
CARD 2 RAM           SPACE: MAX    CONTIG 1 TOTAL 1
PHRASE_EXT           PHRASE_INT    LENGTH
L91                  9             8
L40                  17            8
L61                  25            8
DEACTANN_306         33            6
CARD 3 RAM           SPACE: MAX    CONTIG 0 TOTAL 0
PHRASE_EXT           PHRASE_INT    LENGTH
L225                 20            10
STDENAN_301          30            8
```

Table 2 provides an example of the data stored in the DMS™ switch under a "Display of DRAM" table for DRAM1.

TABLE 2

Display of Dram for DRAM1

```
Display of Dram
1 0 MTM 11 0 1X75BA CTLR DRAM1
CARD 0 CTLR          SPACE: MAX    CONTIG 0 TOTAL 0
CARD 1 RAM           SPACE: MAX    CONTIG 2 TOTAL 2
PHRASE_EXT           PHRASE_INT    LENGTH
```

TABLE 2-continued

Display of Dram for DRAM1

```
STDENAN_301          9             8
DEACTANN_306         33            5
FNALANN_303          17            5
CFNMANN_308          22            11
CARD 2 RAM           SPACE: MAX    CONTIG 2 TOTAL 2
PHRASE_EXT           PHRASE_INT    LENGTH
L231                 28            10
CNFCOT_310           9             10
BUSYANN_302          19            9
```

Although only two DRAMs are shown here, the data stored on DMST™ switch could include additional "Display of DRAM" tables for each additional DRAM.

Table 3 provides an example of the data stored in the DMS™ switch under the thirteen translation tables enumerated above.

TABLE 3

Translation Listing Tables

"ANNS"

```
Listing table ANNS
CLLI ANNTYP TRAFSNO MAXCONN CYTIME MAXCYC
NCA STND Y 15 15 13 2
CNLSPUBAN STND Y 15 15 13 2
VCA STND Y 15 15 13 2
ROHAN STND Y 15 15 13 2
BLDNAN STND Y 15 15 13 2
(cont'd . . . )
```

"ANNMEMS"

```
Listing table ANNMEMS
ANNMEM HDWTYPE CARD MEMINFO
NCA 0 DRAM DRA (0 MTM 8 16) $
NCA 1 DRAM DRA (0 MTM 34 5) $
CNLSPUBAN 0 DRAM DRA (0 MTM 8 7) $
VCA 0 DRAM DRA (0 MTM 8 23) $
(cont'd . . . )
```

"CLLI"

```
Listing table CLLI
CLLI ADNUM TRKGRSIZ ADMININF
DMODEMC 2 4 NEW_MODEM_3X02CA_CLLI
DUMPANDRESTORE 28 0 DUMP_AND_RESTORE
OFFHKSUP 10 10 SUPERVISION_SIGNAL_OFFHOOK
WINKSUP 20 10 SUPERVISION_SIGNAL_WINK
ONHKSUP 11 10 SUPERVISION SIGNAL_ONHOOK
(cont'd . . . )
```

"DRAMS"

```
Listing table DRAMS
DRANCARD TMTYPE TMNO TMCKT CARDCODE CARDINFO
0 0 MTM 8 0 1X75BA CTLR DRAM0
0 1 MTM 8 2 1X76AA PROM (0) $
0 2 MTM 8 4 1X77AA RAM (1) $
0 3 MTM 8 6 1X77AA RAM (2) $
0 4 MTM 8 8 1X77AA RAM (3) $
(cont'd . . . )
```

"DRAMTRK"

```
Listing table DRAMTRK
ANNTRACK PHSLIST
NCA 0 (L61) $
CNLSPUBAN 0 (L225) $
VCA 0 (L40) $
ROHAN 0 (ROH) $
(cont'd . . . )
```

"DRMUSERS"

```
Listing table DRMUSERS
USERANN PHSLIST
CFRAANN 1 (LANGUAGE1) (CFPAEDNPIN1) (CFRAESEVENDIG)
```

TABLE 3-continued

Translation Listing Tables (CFRAEDNPIN2) $
CFRAANN 2 (LANGUAGE1) (CFRAEFAC) $
CFRAANN 3 (LANGUAGE1) (CFPAEFWDN) $
CFRAANN 4 (LANGUAGE1) (CFPAEFWD1) (ENGVARDNF)
(CFPAEFWD2) $
(cont'd . . . )

"TMINV"

Listing table TMINV
TMNM FRTYPE FRNO SHPOS FLOOR ROW FRPOS LKDATA
EQPEC LOAD EXECS SCTMLOC
TM8 0 TME 0 4 1 F 0 0 31 0 0 2X52AG BTMKAO2 TM8EX SHELF
TM8 1 TME1 18 1 F 1 0 32 2 0 2X52AG BTMKAO2 TM8EX SHELF
TM8 2 TME2 18 1 F 2 0 10 4 0 2X52AG BTMKA02 TM8EX SHELF
TM8 3 TME3 18 1 F 3 0 31 5 0 2X52AG BTMKA02 TM8EX SHELF
TM8 4 TME6 18 1 G 1 0 32 9 0 2X52AG BTMKA02 TM8EX SHELF
(cont'd . . . )

"DNROUTE"

Listing table DNROUTE
AREACODE OFCCODE STNCODE DNRESULT
205 663 0032 T OFRT 271
205 663 0065 D OPRT
205 663 0098 D OPRT
205 663 0298 D OPRT
(cont'd . . . )

"OFRT"

Listing table OFRT
RTE RTELIST
41 (S D T60) (S D T60) (S D T60) $
47 (S D T60) (S D T60) (S D T60) $
66 (S D T60) (S D T60) (S D T60) $
122 (N D BRHMCHCCS72W 3 N N) $
(cont'd . . . )

"OFR 2"

Listing table OFR2
RTE RTELIST
1 (N D BRHMMTCCS 0 205 N) $
2 (N D BRHMHWDT 0 205 N) $
3 (N D BRHMHWDT 0 205 N) (N D BRHMMTCCS 0 205 N) $
4 (N D BRHMMTCCS 0 205 N) (N D BRHMHWDT 0 205 N) $
(cont'd . . . )

"OFR 3"

Listing table OFR3
RTE RTELIST
Table: OFR3                          Size:     0

"OFR 4"

Listing table OFR4
RTE RTELIST
Table: OFR4                          Size:     0

"TRKNAME"

Listing table TRKNANE
ADNUM CLLI
1 DLSE
2 DMODEMC
3 DPPSC
4 DSCKT
(cont'd . . . )

As shown in Tables 1–3, a typical DMS™ switch contains a large amount of data. FIG. 3A summarizes this data by showing the data fields 300 that correspond to each translation table 302. For example, in Table 3 above, the headings for the "TRKNAME" translation table are ADNUM and CLLI, which correspond to the fields 1 and 2 for the "TRKNAME" table listed in the spreadsheet of FIG. 3A.

Whether entered manually from the paper or electronic records of non-incorporated switches or retrieved directly from data stored in incorporated switches, at the conclusion of step 251, switch data collected from one or more central offices is stored in a database (e.g., workstation 290 of FIG. 2A).

After collecting the switch data from each central office, in step 252 (FIG. 2B), the collected data is pared down and organized into a usable format so that those who are involved in assigning and maintaining recorded announcements can access the appropriate information. Paring down the switch data involves identifying and extracting only the data necessary for the assignment and maintenance of recorded announcements. This data can include, for example, the number and capacity of the recorded announcement units in each central office and the number and type of announcements stored on each unit. For example, if a central office has five recorded announcement units, each having eight channels capable of storing one recorded announcement each, then the central office as a whole has the capacity to store up to forty different recorded announcements.

This format allows for, among other things, monitoring capacity available at the switches, such that when a new announcement is needed, it can be properly assigned to a central office having appropriate capacity. In other words, by implementing embodiments of the invention, a person responsible for assigning recorded announcements can readily determine which recorded announcement channels are available. Central office managers can also conveniently determine when the recorded announcement equipment of a central office has reached capacity, so that additional equipment can be allotted.

In completing step 252 for non-incorporated switches, the recorded announcement data is retrieved from the switch data by hand, as was the switch data in step 251. In an alternative embodiment for non-incorporated switches, steps 251 and 252 may be combined such that, in collecting switch data from paper or electronic records, only the switch data related to recorded announcements is captured.

In completing step 252 for incorporated switches, the recorded announcement data must be extracted from the translation tables, which contain large amounts of data irrelevant to the assignment and maintenance of recorded announcements. Therefore, for incorporated switches, step 252 involves selectively retrieving data from the translation tables to compile a pared-down body of data relating only to desired recorded announcement information.

Figure 3B:
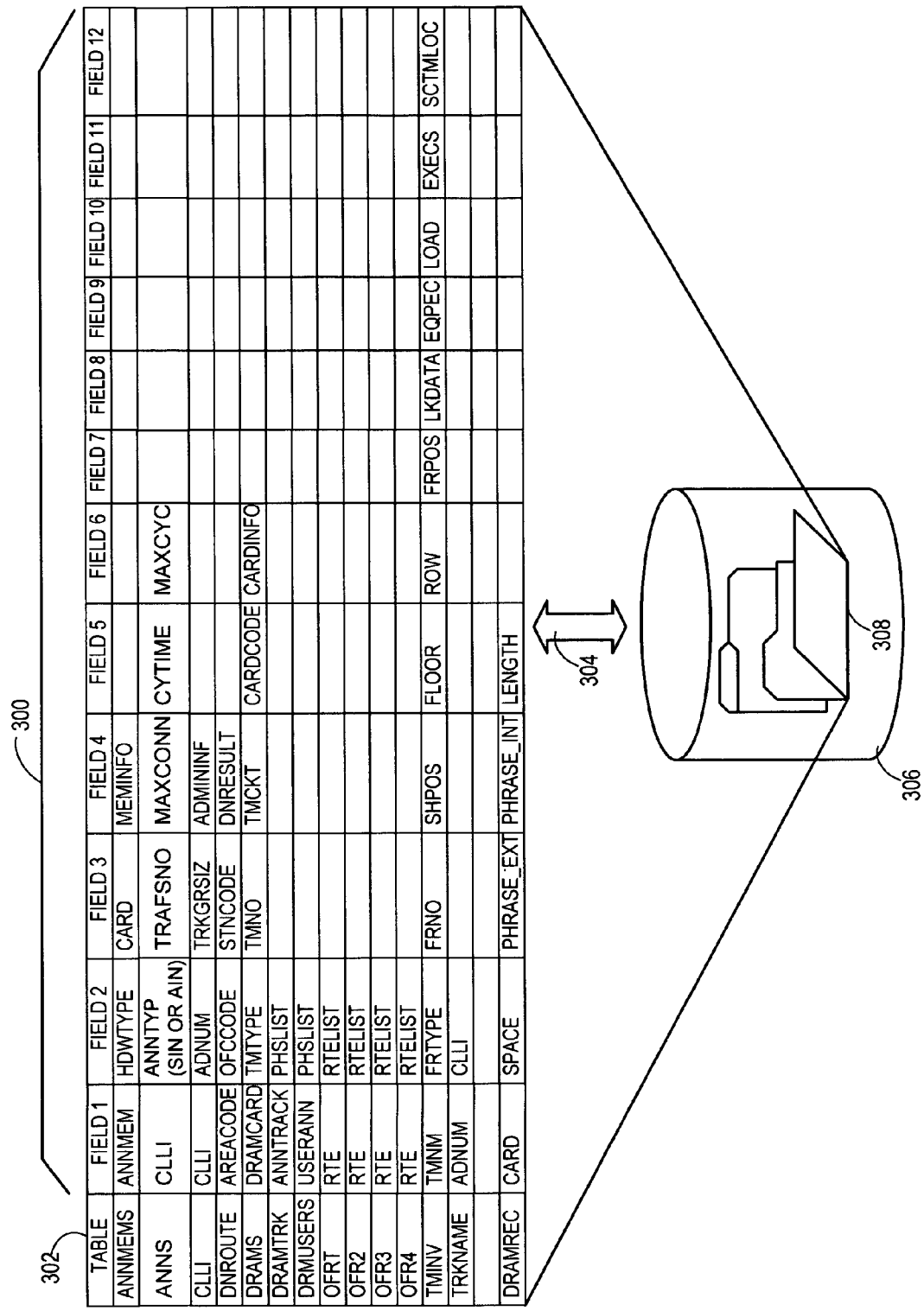
FIG. 3B is a schematic diagram illustrating the retrieval of recorded announcement data fields from translation tables of a switch, according to an embodiment of the present invention.

For example, of all of the data fields available in the data file of a DMS™ switch (e.g., as shown in FIG. 3A), only a subset is necessary for assigning and managing recorded announcements. Thus, for a DMS™ switch, step 252 requires a selection of data fields from the retrieved tables. FIG. 3B illustrates the selection of an exemplary subset, as indicated by the shaded fields.

As illustrated in FIG. 3B, a query 304 is sent to the incorporated switch requesting data from certain translation tables and DRAMREC display 302. The shaded subset of data fields corresponds to the inventory information needed to manage and maintain the recorded announcements. The data from the translation tables and DRAMREC display 302 is stored in a workstation 290 (FIG. 2A). The data from the shaded fields shown in FIG. 3B is selected from each set of tables for each central office and placed in a database 306. Database 306 preferably organizes the stored data according to central office. For example, the data from one central office is stored in an individual file 308 as shown in FIG. 3B, with each set of data from other central offices stored in a separate file.

In extracting the recorded announcement data from the switch data (for either non-incorporated or incorporated switches), step 252 groups the recorded announcement data according to central office. Thus, the recorded announcement data includes the shaded data of FIG. 3B, grouped according to central office. FIG. 3C illustrates an exemplary table of recorded announcement information for a central office XYZ.

According to an embodiment of the present invention, the collecting of switch data (step 251) and extracting of recorded announcement data (step 252) from switches is periodically performed to ensure that database 306 (FIG. 3B) contains accurate up-to-date information. For non-incorporated switches, this data maintenance relies first on the thorough inventory of the recorded announcement data (from paper/electronic records) at an initial point in time, and second, on diligent updating of the inventory based on the reporting of changes in the recorded announcement data (e.g., when an announcement is added). A routine survey of the non-incorporated switches could also be performed to catch changes in the recorded announcement data that may have mistakenly not been reported. For incorporated switches, a periodic query to the switches and the retrieval of the current data ensures that the recorded announcement data is accurate. These queries could be initiated by a user or automatically generated on a routine basis through a network.

Figure 4A:
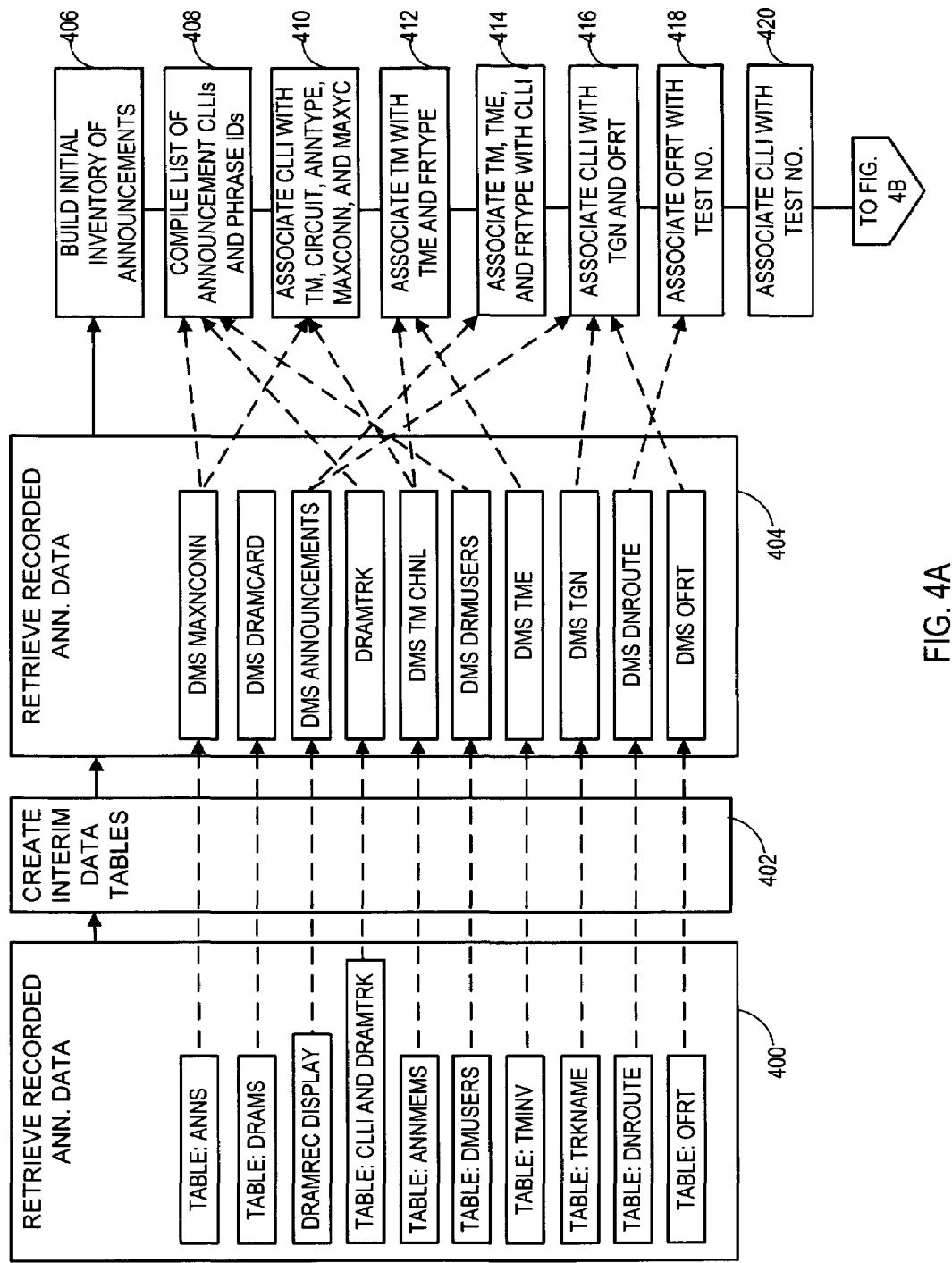
Figure 5:
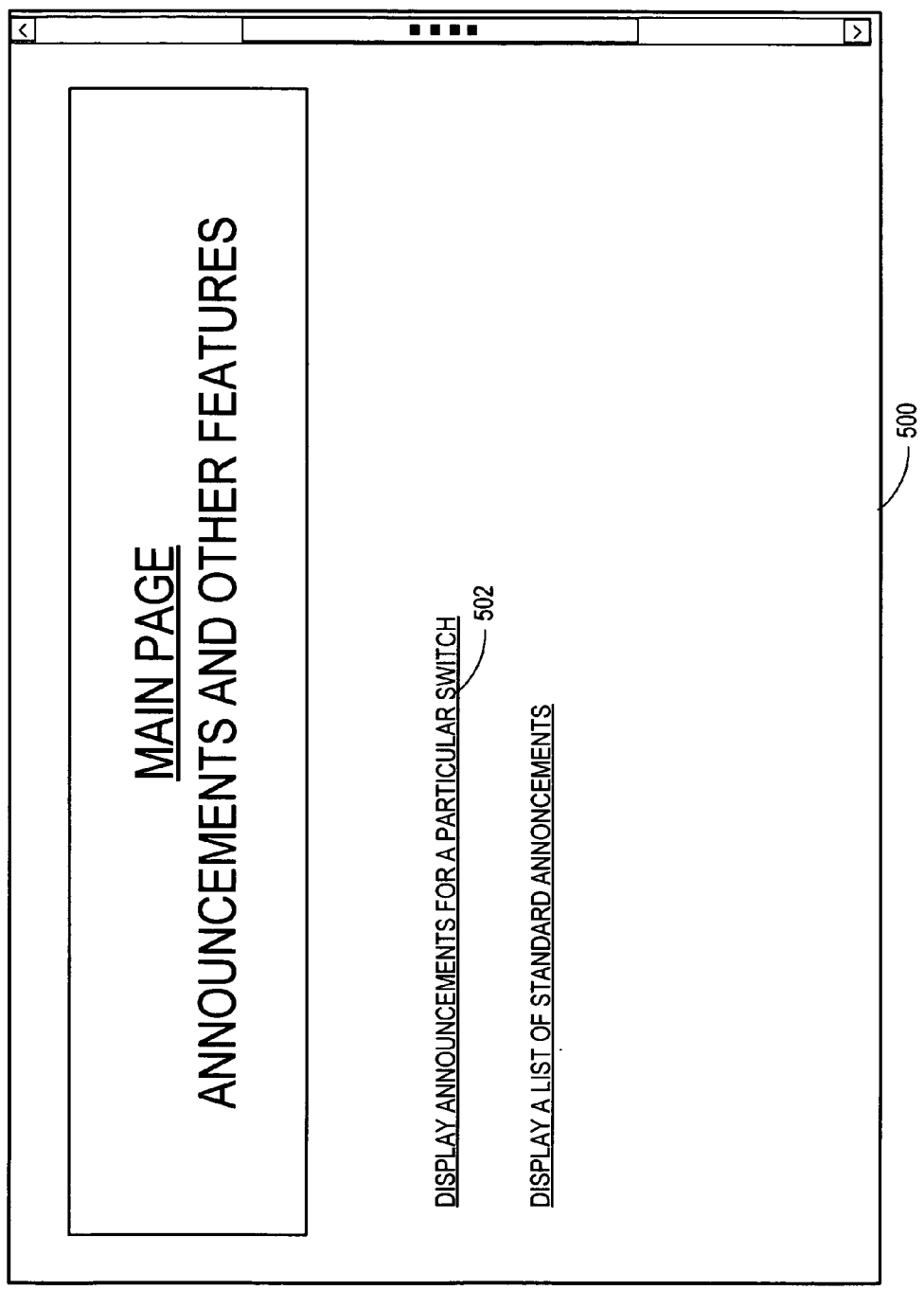
FIG. 5 is a screen image of an exemplary user interface main page through which a user accesses recorded announcement information, according to an embodiment of the present invention.

FIGS. 4A–4B illustrate in greater detail an exemplary process for collecting (step 251) switch data from a switch of a central office and extracting recorded announcement data (step 252) into a format that is ready for access by users. Although this particular exemplary process involves an incorporated switch, one of ordinary skill in the art would appreciate that the same process could be adapted to a non-incorporated switch by substituting the steps dealing with data stored on the incorporated switch (i.e., translation tables) with the tasks involved in collecting inventory information from a non-incorporated switch.

As shown in FIG. 4A, in step 400, the process begins by retrieving the translation tables and DRAMREC display of the incorporated switch. Typically, only a portion of the data contained in the tables and DRAMREC display is relevant to recorded announcements. The tables in this example correspond to those described above in reference to table of FIG. 3A. A user retrieves the data by, for example, downloading it from the switch to a local workstation (e.g., personal computer) in communication with the switch (either on site or remotely through a network), such as workstation 290 of FIG. 2A.

In step 402, interim data tables are created. These data tables are configured to receive data from particular data fields of the translation tables and DRAMREC display of step 400. The particular data fields correspond to data that is relevant to recorded announcements, which in this example are the shaded fields shown in FIG. 3B.

In step 404, the interim data tables are populated with the data from the particular data fields of the translation tables and DRAMREC display. Thus, for example, at the conclusion of step 404, the interim data tables would be populated with the shaded fields of FIG. 3B. These interim data tables would be stored, for example, on the local workstation in communication with the switch (e.g., workstation 290).

Each interim data table corresponds to the translation table from which it received the particular data. In FIG. 4A, these corresponding tables are shown across from each other on the same horizontal level, connected by dashed lines. For example, interim data table DMS Maxconn receives its data from translation table ANNS. Referring to FIG. 3B, Maxconn is a field of the translation table ANNS. Similarly, the other interim data tables of step 404 derive data from translation tables as follows:

DRAMS → DMS DRAMcard;
DRAMREC Display → DMS Announcements;
CLLI and DRAMTRK → DRAMTRK;
ANNMEMS → DMS TM CHNL;
DRMUSERS → DMS DRMUSERS;
TMINV → DMS TME;
TRKNAME → DMS TGN;
DNROUTE → DMS DNROUTE; and
OFRT → DMS OFRT.

FIG. 3D lists exemplary recorded announcement data fields for these interim tables, according to an embodiment of the present invention.

In step 406, an initial inventory of announcements is built. To begin building this initial inventory, a table is populated from the data in DRAMREC. This table lists the DRAM/EDRAM cards and the announcement phrases that are stored on each.

Typically, in a DMS™, recorded announcements are stored on DRAMs or EDRAMs, which each have a recording capacity of up to 248 seconds of announcements. There are, however, factors that may limit the quantity of announcements that may be placed on a DRAM or EDRAM.

DRAMs and EDRAMs are mounted in Trunk Modules (TMs). The TMs provide Circuits (speech paths) that connect the DRAMs or EDRAMs to the switch network.

In a DRAM or EDRAM there are up to eight cards that contain a specified amount of recording capacity. DRAMs consist of up to eight physically distinct cards. EDRAMs have one physical card that is viewed as a set of up to eight virtual cards in switch translations.

In all DRAM and most EDRAM configurations, there are up to eight cards with 31 seconds each. Some EDRAMs may be configured with up to four dual cards with 62 seconds each.

The data from DRAMREC includes each DRAM or EDRAM and the cards configured for each one. The data also lists the announcement phrases stored on each card.

Announcement phrases are associated with announcement CLLIs in switch translations. When a call scenario requires an announcement, the appropriate announcement CLLI is identified by translation entries. In turn, the announcement CLLI is linked to one or more phrases that are accessed from a DRAM or EDRAM. The DRAM or EDRAM plays the selected phrase(s) over a speech path that is then connected by the switch network to the appropriate time slot.

Referring to FIG. 4A, after building the initial inventory of announcements in step 406, the next several steps create associations between fields of the inventory of announcements. For each step, the dashed arrow lines of FIG. 4A indicate the interim data tables from which the associations are made. Accordingly, as shown in step 408 of FIG. 4A, data from tables DMS Maxconn, DMS DRAMTRK, and DMS DRMUSERS is used to compile a list of announcement CLLIs and associated phrases. The phrases from the DMS Announcement table are associated with announcement CLLIs.

In step 410, the announcement CLLIs are associated with the TM and Circuit fields in the DMS TM CHNL table, and the ANNTYPE, MaxConnect and MAXCYC fields in the DMS Maxconn table.

In step 412, the TM field in the DMS TM CHNL table is associated with the TME and FRTYPE fields in the DMS TME table.

In step 414, the TM, TME and FRTYPE fields are then associated with the announcement CLLI in the DMS Announcement table.

In step 416, the announcement CLLIs in the DMS Announcement table are associated with the TGN field in the DMS TGN table and the OFRT field in the DMS OFRT table.

In step 418, the OFRT is then associated with the Test Number in the DMS DNROUTE table.

Finally, in step 420, the announcement CLLIs may be associated with the test numbers.

As a result of associating the fields in steps 408–420, the local workstation in communication with the switch contains an announcement inventory table having the following fields: CLLI; DRAM_NUM; ANNOUNC_NUM; LIST_NUM; STD_ABBRV; MAX_CONN; CARD_TYPE; SEC_USED; TMNO; TME; CHNL; MTM_FOR_DTM; CARD_POS; CYCLES; ANNC_TYPE; TGN; OFRT; and TESTNUM.

Referring now to FIG. 4B, with the announcement inventory table stored on the local workstation, the table is ready to be uploaded to the database of a server (e.g., a server in communication with network 280 such as server 295) that can be accessed by multiple users (to provide access to the recorded announcement information as described for step 253 of FIG. 2B). This database can be of any type that allows multiple access, such as relational databases that use structure query language (SQL) calls.

Before uploading the table to the server, however, in step 422 (FIG. 4B), data for the switch corresponding to the table is extracted from the server and stored in one or more "carry-over" tables. In other words, prior to populating tables of the server database with the new data downloaded from the switch and reformatted in the local workstation, the existing data for the switch is extracted from the server database. This extraction preserves data that the translation tables of the switch may not contain. For example, data that was populated during the assignment of new announcements might not be stored in the switch. As another example, announcements may have been assigned in the server database but not yet built into the switch translation tables. The one or more carry-over tables ensure that these types of data are not lost.

In step 424, after the interim data tables are built, associated, and stored on the local workstation, integrity checks are performed to ensure that the new data is sound. In each subroutine, any errors trigger an alert that halts further action. This step is especially important in anticipation of the next step of deleting the current switch data from the server database.

With the new data validated and ready for uploading, in step 426, the existing switch data is deleted from the server database.

Then, in step 428, the newly built inventory of information in the local workstation is uploaded to the server database. In a representative embodiment, the data from the tables on the local workstation populate three tables in the server database. First, DRAM circuit data from the DMS TM CHNL table is loaded into a DRAM_CKTS table. Second, the data in the local Announcement table is aggregated to the DRAM/EDRAM card level to populate a FRAME table. Lastly, the data from the interim announcement table is loaded into an ANNOUNCEMENT table on the database server (e.g., server 295 of FIG. 2A).

With the new data loaded, in step 430, the data from the carry-over tables is compared to the newly built inventory to determine which announcements are not yet translated in the switch. The data not found in the translation tables is then used to populate the server database.

Finally, in step 432, after the new data and the existing carry-over data has been loaded into the server database tables, additional integrity checks are performed to ensure that all of the announcements have been loaded properly.

Referring again to FIG. 2B, after collecting and formatting the inventory information, the present invention provides users with access to the formatted inventory information to facilitate the assignment and maintenance of recorded announcements. With reference to FIG. 2A, the formatted information is stored, for example, on database 260 or another computer or server in communication with network 280. Users gain access to the formatted information through a computer in communication network 280 (e.g., workstation 290). An interface application provisioned on the computer retrieves the information stored in the database and presents it to the user.

FIGS. 5–10 illustrate exemplary user interfaces for accessing the formatted inventory information, according to an embodiment of the present invention. First, a user logs on to a secure web site (e.g., using a password and user identification), which displays a main page, such as the exemplary page 500 shown in FIG. 5. Main page 500 provides a link 502 for displaying the announcements of a particular switch, i.e., accessing the formatted inventory information.

Figure 6:
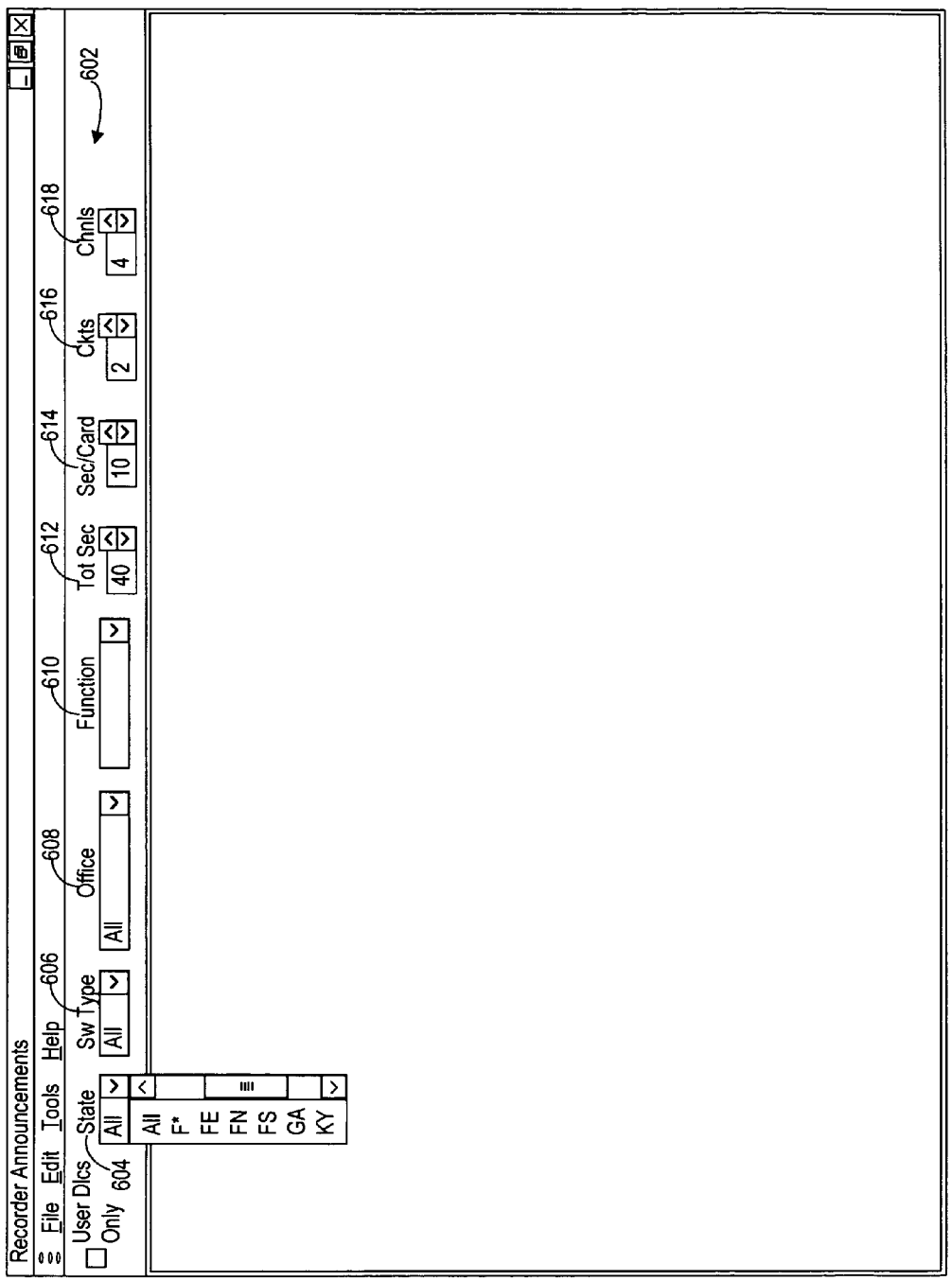
FIG. 6 is a screen image of an exemplary user interface page through which a user selects offices for which the user wishes to view or evaluate recorded announcement data, according to an embodiment of the present invention.

In response to clicking on link 502, the interface application displays a window such as window 600 shown in FIG. 6. As shown, window 600 has a series of data fields 602, with which a user can select offices that the user wishes to view or evaluate. The user may limit her selection by specifying the state (field 604), the switch type (field 606), the particular office (field 608), and/or fields relating to the capacities of recorded announcement equipment (total seconds 612, seconds per card 614, circuits 616, and channels 618). The function field 610 provides several options (described below) for accessing, sorting, filtering, and otherwise manipulating the recorded announcement information.

In this embodiment, the fields 612, 614, 616, and 618 are used to select offices based on the capacity of recorded announcement equipment in each office. The fields labeled Tot Sec 612, Sec/Card 614, and Ckts 616 relate to incorporated switches (e.g., DMS100/200™ offices), while the field labeled Chnls 618 relates to non-incorporated switches (e.g., 5ESS™ and 1AESS™ offices). The use of these fields is explained in more detail below in reference to selecting offices to evaluate.

Figure 7:
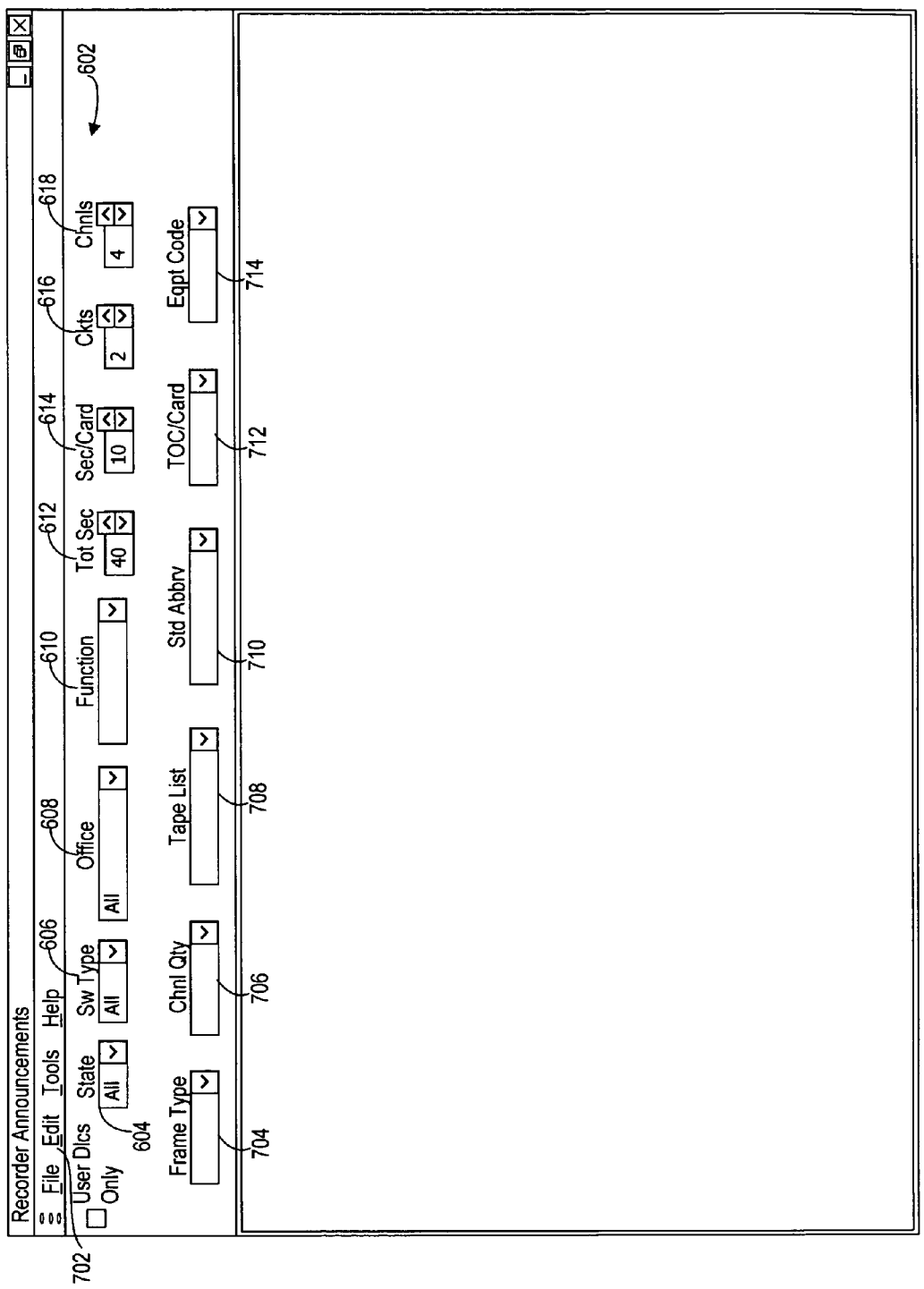
FIG. 7 is a screen image of an exemplary user interface page through which a user enters equipment or announcement parameters, according to an embodiment of the present invention.

Referring to FIG. 7, in this embodiment, a second row of drop-down boxes 700 appears if a user selects "Add Eqpt" or "Modify Eqpt" from the Edit option 702 of the menu bar. This second row of boxes 700 is used to populate equipment or announcement parameters, such as frametype 704, channel quantity 706, tape list number 708, standard abbreviation 710, trunk order code (TOC)/card 712, and equipment code 714. Preferably, each parameter field 704, 706, 708, 710, 712, and 714 has pre-defined choices available through drop-down menus. Alternatively, a user may enter information for these parameters and any other parameters manually by typing the information in the appropriate field.

After a user selects a function option from the function field 610 as shown in FIG. 8A, an equipment window 800 appears, which resembles a spreadsheet. Equipment window 800 lists the office and equipment information.

Each row in equipment window corresponds to a particular recorded announcement unit. In response to a user's clicking a row, an announcement window 802 (also resembling a spreadsheet) appears below equipment window 800, as shown in FIG. 8B. Announcement window 802 displays information regarding announcements assigned to the selected unit.

Figure 9A:
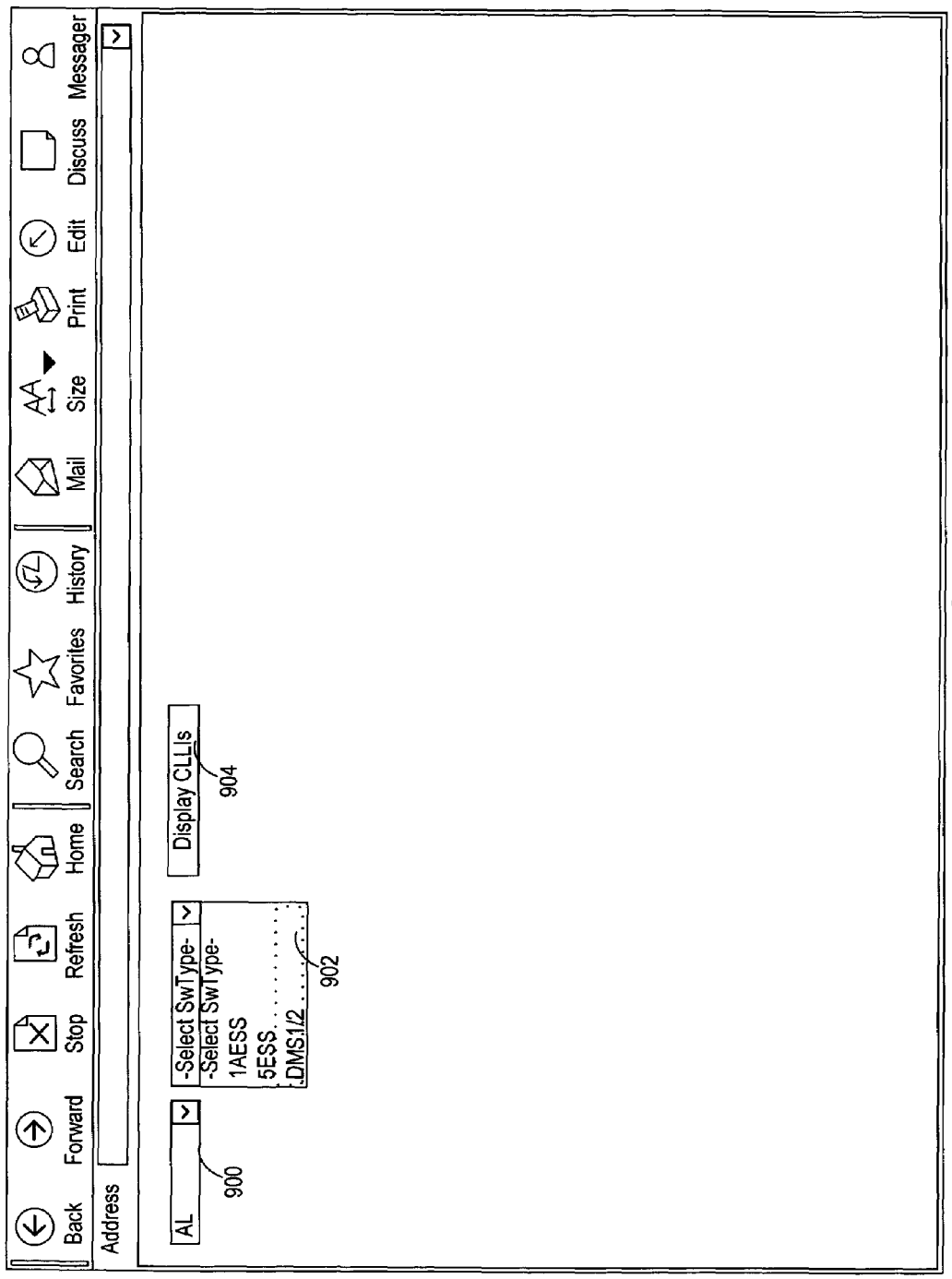
FIG. 9A is screen image of an exemplary user interface page through which a user specifies a state and switch type to access recorded announcement information, according to an embodiment of the present invention.

FIGS. 9A–9D illustrate an alternate user interface for accessing recorded announcement information, which could be considered a simplified version of the interface shown in FIGS. 7, 8A, and 8B. As shown in FIG. 9A, this exemplary interface provides data fields 900 and 902 for specifying a state and switch type, respectively. The switch type could be, for example, an incorporated switch (e.g., DMS½™) or a non-incorporated switch (e.g., 1AESS™ or 5ESS™). After choosing the state and switch type, the user clicks on the "Display CLLIs" button 904 to display the central offices (identified by CLLIs) that meet the state and switch type criteria.

Figure 9B:
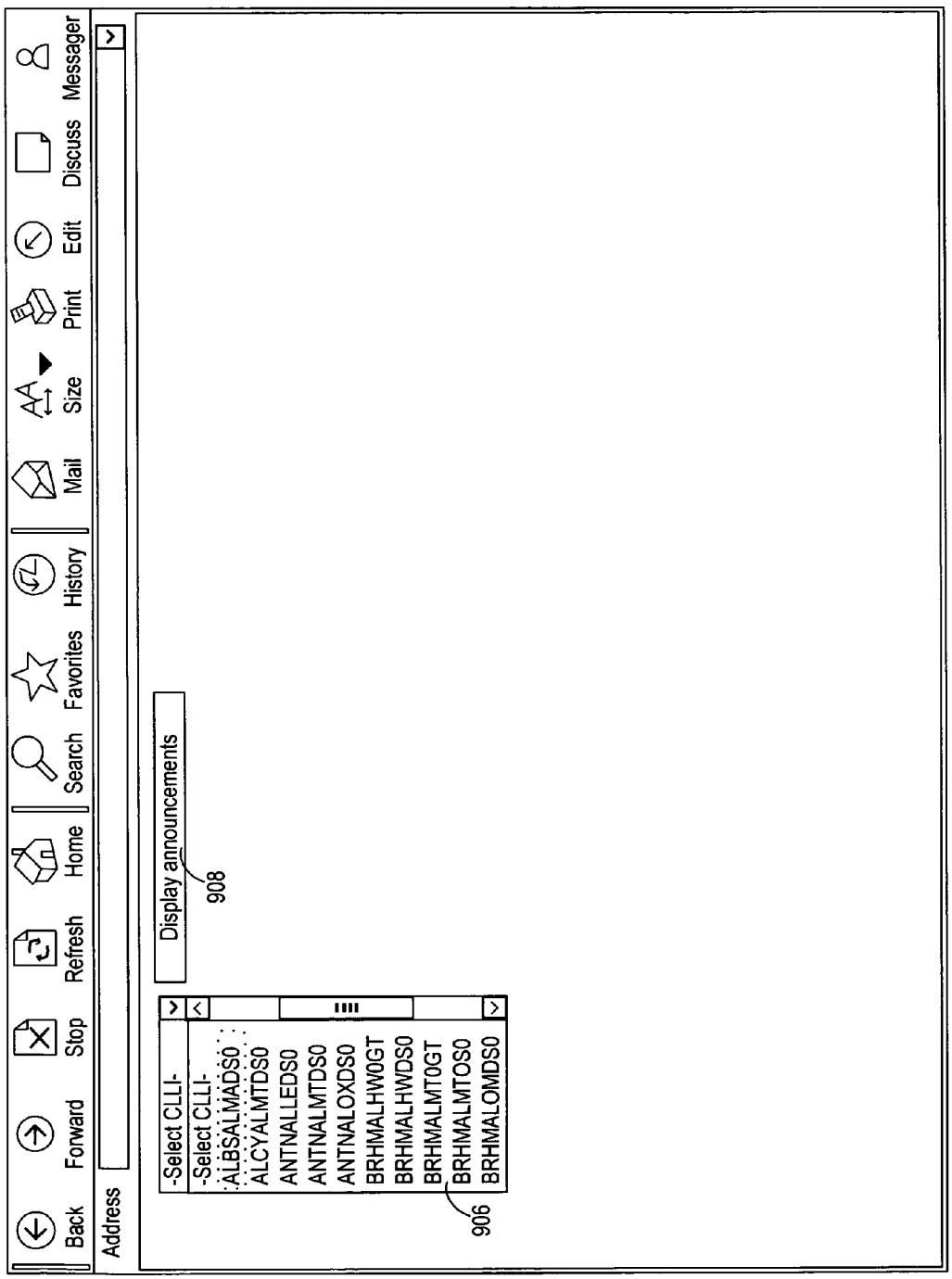
FIG. 9B is a screen image of an exemplary user interface page through which a user selects a desired CLLI for which to view recorded announcement information, according to an embodiment of the present invention.

In response, the interface application displays the central offices (again, identified by CLLIs) that meet the criteria in a drop-down data field 906, as shown in FIG. 9B. The user then selects the desired CLLI and clicks on the "Display Announcements" button 908.

In response, as shown in FIG. 9C, the interface application displays a table 910 of the recorded announcement information for the selected central office, which in this example is Central Office 23. Although not shown in FIG. 9C, table 910 includes a column that provides a list number and/or a standard abbreviation for each DRAM card. This list number or standard abbreviation identifies a particular recorded announcement. FIG. 9D provides an exemplary table 912 of standard recorded announcements listed by list number and standard abbreviation, and including exemplary wording for each announcement.

Selecting Offices to Make Assignments

An embodiment of the present invention provides a process that allows a user to display an office and the recorded announcement equipment in that office. Alternatively, as discussed below, a user may want to display only the announcements that are associated with a particular "Identification ID."

Referring to FIG. 6, a user may begin the selection of offices by choosing the location (e.g., state, region, time zone, and/or LATA) with which a user wants to work. The user makes this choice of location by clicking on the state drop-down box 604 and selecting a particular state or region or "All" from the list. Selecting a particular state or region limits the amount of information to be displayed and allows the information to be displayed more quickly.

Next, if a user would like to deal with offices of a particular type, the user can select the desired type from the SwType drop-down box 606. In this embodiment, selecting "All" displays all switch types.

If a user would like to deal with a particular office, the user can select the desired office from the Office drop-down box 608. If a user wants to see all offices in the selected state and of the type selected, the user can choose "All" from the list. If a user is performing a search or analysis of all of the offices in an entire state, it may be appropriate to choose "All" from the list of offices.

To see the selected office(s), the user chooses "View All" from the function drop-down box 610. In response, as shown in FIG. 8A, the interface application displays all of the equipment in the selected office(s) in an equipment window 800. FIG. 8A also shows the parameters chosen for the search in fields 602.

Any time that a user wants to refresh the display of offices, the user can select an option from the function drop-down box 610.

Once the equipment in a desired office(s) is displayed, in this embodiment, a user may make new assignments to the equipment or modify existing assignments. To make assignments, the user follows a process along the lines described below in the section "Making Assignments to Recorded Announcement Equipment."

If an office with which a user wants to work is not displayed, the user contacts the administrator of the interface application. The administrator can add an office by selecting "Add Ofc" from the Edit option 702 on the menu bar. When adding an office, the administrator preferably manually enters the CLLI and SwType in the appropriate fields.

Referring to FIG. 10, an embodiment of the present invention provides a feature that allows a user to display the announcements that are associated with a particular "Notice ID." Preferably, a Notice ID is shown on an email message or other communication that an administrator sends when new announcements are assigned. To use the Notice ID feature, the user selects the View option 1000 from the menu bar, and then selects the Notice ID option from the drop-down menu that results (not shown). In response, a text box 1002 labeled "Enter Notice ID" is displayed, along with other controls. To display announcements associated with a Notice ID, the user enters the Notice ID in text box 1002 and presses enter. In response, the announcements associated with the entered Notice ID are displayed in a window 1004. In this embodiment, in response to a user's clicking one of the announcements displayed in window 1004, the interface application displays in fields 1006 other information regarding the office and frame at which the selected announcement is recorded.

Making Assignments to Recorded Announcement Equipment

A further embodiment of the present invention enables a user to make new announcement assignments or change existing assignments. As shown in FIG. 6, with the desired office(s) displayed in field 608, the process begins with the user's selecting "Modify Eqpt" from the Edit option 702 on the menu bar. In response, the interface application displays a second row of drop-down boxes, such as the fields 700 shown in FIG. 7. Some of these boxes are used to enter parameters associated with equipment as described below in the section "Provisioning Recorded Announcement Equipment." The a other boxes are used to enter parameters associated with announcements as described below in this section. However, not all parameters are entered through the use of drop-down boxes. Drop-down boxes are provided for parameters that have pre-defined values. The other parameters are entered by manually typing the appropriate values. Also, values for any of the fields may be manually entered even if there are associated drop-down boxes.

To make or change assignments, a user selects the desired unit in the Equipment window 800 (see FIG. 8A). To make the assignments, a user specifies announcement-related parameters as follows.

First, the user chooses a tape list number or standard abbreviation from drop-down fields 708 and 710 (see FIG. 7). In response, Announcement window 800 (FIG. 8A) displays the "PhraseID" that corresponds to the list number, and the "AnncCLLI" that corresponds to the standard abbreviation. The two drop-down boxes 708 and 710 are synchronized so that if a user selects a value from one box, the correct corresponding value for the other appears. Values are provided for all known recorded announcements. A user may, however, manually enter parameters to identify new or specialized announcements. The server database provides the length in seconds for known announcements. Users can enter the length in seconds for manually entered announcements. The wording for announcements that are in the drop-down lists may be displayed by double-clicking either of the labels above the drop-down lists, or by double-clicking an announcement that has been entered in Announcement window 800.

An embodiment of the present invention also provides for the tracking of announcement requests and notices. When a user makes a new assignment to a unit, the interface application displays a window that allows the user to enter information regarding the request or notice associated with the new announcement. This embodiment allows the user to retain a record of newly assigned announcements, which includes the services and due dates associated with the announcement. Each record has a unique tracking number called a Notice ID. If a user is assigning multiple announcements associated with one request, the user can use the same Notice ID against all the announcements.

If there is no available space for an announcement, but a user wants to enter a Notice record for it, the interface application allows the user to hold down the shift key and press the PageUp key. The interface application then displays window in which the user can enter information associated with the announcement, including a note indicating that no space is currently available. Later, when the announcement is assigned to a unit that has been made available, the previously entered Notice record may be associated with the announcement.

The interface application enables a user to display an existing Notice record for an announcement by holding down the shift key and pressing the PageUp key. The interface application then displays a window in which the user can edit the information or delete the Notice record.

Referring to FIG. 10, the interface application also enables a user to display all Notice records of a particular state or region by selecting the "View Notices" under the Tools option 1000 on the menu bar.

In continuing to make the assignment, after choosing the tape list or standard abbreviation and entering a notice if desired, the user specifies trunks and MaxConnect. For non-incorporated switches such as 1AESS™ switches, the user manually enters the quantity of trunks in a QtyTrks field and the trunk group number in a TGN field. The server database computes and populates the capacity for the indicated quantity of trunks. For non-incorporated switches such as 5ESS™, the user manually enters the values for MaxCalls, TGN, and TMN.

For incorporated switches such as DMS™ switches, the user manually enters the values for MaxConn, TGN, Chnl (also referred to as Trk Ckt), and OFRT. The Ckt and OFRT are fields determined as part of setting the translations. Each announcement may be assigned one or more Channels (Ckts). To make the channel assignments, the user clicks the Ckt field, in response to which the interface application displays another window containing the currently assigned Ckts. On this window, after the user clicks the desired available Ckt, the interface application displays the standard abbreviation in the same row. Alternatively, if a user needs to assign several Ckts, the user enters a currently vacant Ckt or range of Ckts in a text box to assign to the selected announcement. When the user presses enter, the interface application displays the standard abbreviation next to the selected Ckts.

After assigning the circuits, in continuing to make the assignment, the user specifies trunk order code (TOC), card type, and/or equipment code, depending on the type of switch. For non-incorporated switches such as 1AESS™ switches, the user chooses TOC from the drop-down lists. For non-incorporated switches such as 5ESS™ switches, the user chooses TOC and Eqpt Code from the drop-down lists. For incorporated switches such as DMS™ switches, the user chooses CardType and Eqpt Code from the drop-down lists.

Finally, the user finishes making the assignment by manually entering the RouteIndex, the Test Number, a B or I in a B/I (BroadCast/Interactive) field, and the Access Code.

Selecting Offices Based on Available Capacity

A further embodiment of the present invention provides a process that allows a user to select offices based on available capacity. The steps described above in the section "Selecting Offices to Make Assignments" (to select the desired State, Switch Type and Office) would be executed prior to choosing one of the functions described below in selecting offices based on available capacity.

To evaluate an office or offices, a user chooses "Ofcs Needing Eqpt", "Ofcs with Spares" or "Eqpt with Spares" from function drop-down box 610 (FIG. 6). Each of these functions returns capacity-related information in different forms. For example, the "Ofcs Needing Eqpt" function indicates where additional recorded announcement equipment may be needed, which is helpful for users such as switch capacity managers. The "Ofcs with Spares" function indicates where announcements can be added by listing all of the equipment of offices having spare capacity. This information is especially useful for users such as planners. The "Eqpt with Spares" function is similar to the "Ofcs with Spares" function, except that only the equipment having spare capacity is displayed rather than all of the equipment of offices having spare capacity.

Thus, activating the "Ofcs Needing Eqpt" function displays the offices where additional recorded announcement equipment may be needed. The criteria for determining which offices need equipment are reflected in the fields relating to the capacities of recorded announcement equipment (total seconds 612, seconds per card 614, circuits 616, and channels 618).

The total seconds field 612, seconds per card field 614, and circuits field 616 relate to incorporated switches (e.g., DMS100/200™ offices). The total seconds field 612 refers to the available number of seconds in an office. If there are fewer seconds available for assignment than the quantity shown, then all units in that office will be displayed. Available seconds are counted for each DRAM/EDRAM card only if they exceed the quantity shown in the seconds per card field 614. This parameter is included to ensure that an announcement could actually be assigned to a unit. For example, if a user wants to identify offices having less than 40 spare seconds but is provisioning announcements that each require at least 10 seconds, the user would want to only count the cards that have 10 seconds or more of spare capacity. It would not be helpful to have only 1 or 2 seconds spare capacity on each of several cards in an office, even if they totaled 40 or more seconds.

The circuits field 616 refers to the circuits or channels that connect a DRAM or EDRAM to the switch network. This parameter is also used to ensure that an announcement could actually be assigned to a unit. Typically, at least one circuit is needed for each announcement (although multiple phrases may be assigned to the same circuit), and there are 29 circuits available in each DRAM/EDRAM for announcement assignments. The user preferably sets this parameter to the value corresponding to the number of circuits that will be required for the announcements anticipated for the services being deployed. If a DRAM or EDRAM has fewer circuits than the value selected, that DRAM or EDRAM is considered unavailable for announcement assignment.

The channels field 618 relates to non-incorporated switches (e.g., 1AESS™ and 5ESS™ switches). If an office has fewer spare channels than the quantity shown, all units in that office will be displayed.

Activating the "Ofcs with Spares" function displays all equipment in only the offices where there is the specified spare capacity of recorded announcement equipment. This function complements the "Ofcs Needing Eqpt" function. The criteria for specifying how much spare capacity is needed are also reflected in the fields relating to the capacities of recorded announcement equipment (total seconds 612, seconds per card 614, circuits 616, and channels 618).

The total seconds field 612, seconds per card field 614, and circuits field 616 again relate to incorporated switches (e.g., DMS100/200™ offices). The total seconds field 612 refers to the available number of seconds in an office. If the spare capacity is equal to or greater than the quantity shown, all units in that office are displayed. Available seconds are counted for each DRAM/EDRAM card only if they exceed the quantity shown in the second per card field 614. This parameter is included to ensure that an announcement could actually be assigned to a unit. For example, if a user wants to assign an announcement that is 10 seconds in length, the user needs a card that has 10 seconds of spare capacity. It would not be helpful to have five separate cards with only 2 seconds of spare capacity each.

Again, the circuits field 616 refers to the circuits or channels that connect a DRAM or EDRAM to the switch network. If a DRAM or EDRAM has fewer circuits than the value selected, that DRAM or EDRAM is considered unavailable for announcement assignment.

The channels field 618 again relates to non-incorporated switches (e.g., 1AESS™ and 5ESS™ switches). If the spare capacity is equal to or greater than the quantity shown, all units in that office are displayed.

Activating the "Eqpt with Spares" function displays only the equipment that meets the selection parameters. This is similar to the "Ofcs with Spares" function except that only a portion of the equipment from some offices is displayed. The use of the selection parameters is the same.

Any time that a user wants to refresh the display of offices, the user selects a refresh option from the Function drop-down box 610.

Searching for a Specific Announcement

A further embodiment of the present invention enables a user to locate where a particular announcement is assigned. To use this feature, the interface application provides a search function, which is listed, for example, as an option in the Function drop-down box 610. In response to a user's selecting the search function, the interface application displays additional drop-down boxes that allow the user to indicate which announcement the user needs to locate. Announcements can be identified by list or standard abbreviation. If the announcement that a user needs to locate does not appear in the drop-down boxes, the user can enter an identifying text in a designated field. Clicking a drop-down box or pressing enter on the search text begins the search process.

Wildcard characters may be used to enhance the search for an announcement. For example, an asterisk may be used as a substitute for an indefinite number of characters. As another example, a question mark may be used as a substitute for a single character.

If a user does not know exactly how the announcement was entered in the database, the user can specify some part of the list number or standard abbreviation, along with wild card characters, to find announcements that include that series of characters. For example, if a user want to find an Internet Call Waiting announcement, the user can enter "*ICW*"in the search text box. After the user presses the Enter key, the interface application searches for announcements with "ICW" anywhere in either the list number or standard abbreviation.

Provisioning Recorded Announcement Equipment

A further embodiment of the present invention provides a process for editing (including additions) information related to recorded announcement equipment. These additions or edits can be executed after an office and its associated recorded announcement equipment has been populated in the server database, as described above in reference to, for example, FIGS. 4A and 4B. As described above, for incorporated switches, information is extracted from switch translation tables. For non-incorporated switches, information is collected from available sources and then entered in the server database. When a switch is initially added to the server database, the equipment parameters are populated in the database along with the announcements that are assigned to it.

With the recorded announcement information of a particular switch entered into the server database, this embodiment enables a user to add new equipment or edit existing equipment. If a user makes these additions or revisions, the user preferably ensures that the changes are reflected at the switch (i.e., translation tables) as well. If a user neglects to coordinate the changes, however, the present invention includes safeguards to preserve the entered additions or revisions. Specifically, as described above in reference to FIGS. 4A and 4B, the additions and revisions would be captured in the carry-over tables as the current data from a switch is uploaded to the server database.

The process for adding or editing information related to recorded announcement equipment begins by executing the steps described above under "Selecting Offices to Make Assignments" (i.e., select the desired State, Switch Type, and Office). To add information for a new recorded announcement unit, a user clicks the last existing unit listed in the Equipment window 800 (see FIG. 8A), and then selects "Add Eqpt" from the Edit option 702 on the menu bar. If a user is adding or changing equipment parameters for existing equipment, the user clicks a row in Equipment window 800 to highlight the desired unit, and then selects "Modify Eqpt" from the Edit option 702 on the menu bar.

Preferably, the interface application displays a second row of drop-down boxes when a user selects "Add Eqpt" or "Modify Eqpt." Some of these boxes are used to enter parameters associated with equipment as described below. The other boxes are used to enter parameters associated with announcements as described above in the section "Making Assignments to Recorded Announcement Equipment." However, not all parameters are entered through the use of drop-down boxes. Drop-down boxes are provided for parameters that have pre-defined values. The other parameters are entered by manually typing the appropriate values. Also, values for any of the fields may be manually even if there are associated drop-down boxes.

In the preferred embodiment, messages are used to notify certain groups regarding new announcements. After a new announcement is added, an administrator may create a mail message by first holding down the shift key and clicking the announcement. To view the message, the administrator would select a "Send Mail Message" from the "Tools" option on the menu bar. A window will appear that displays the mail message. By clicking a "Build Message" command button, the proper recipients are added to the recipient list. By clicking the "Send Message" command button, the message is sent.

In accordance with an embodiment of the present invention, instructions adapted to be executed by a processor to perform a method are stored on a computer-readable medium. The computer-readable medium can be a device that stores digital information. For example, a computer-readable medium includes a hard disk, a floppy disk, a tape and a compact disc read-only memory (CD-ROM), all as known in the art for storing software. The computer-readable medium is accessed by a processor suitable for executing instructions adapted to be executed. The term "adapted to be executed" is meant to encompass any instructions that are ready to be executed in their present form (e.g., machine code) by a processor, or require further validation (e.g., compilation, decryption, or provided with an access code, etc.) to be ready to be executed by a processor.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for managing announcement data comprising:
    collecting switch data, the switch data describing one or more characteristics of one or more switches of a network;
    extracting announcement data from the switch data, the announcement data describing one or more characteristics of the switch that relate to the provisioning of announcements from the switch;
    storing the announcement data in a database; and
    providing one or more users with access to the database through a computer network to display the announcement data for the one or more users;
    wherein at least one of the one or more switches is an incorporated switch of a central office of a telecommunications network and the announcements provisioned from the switch are recorded announcements that are audible, and wherein collecting the switch data for the incorporated switch comprises downloading the switch data from the incorporated switch;
    wherein the switch data comprises translation tables, and wherein extracting the recorded announcement data from the switch data comprises
    extracting fields of the translation tables that are associated with recorded announcements;
    wherein storing the recorded announcement data in a database comprises recording the extracted fields in the database;
    wherein storing the recorded announcement data in a database further comprises:
        before recording the extracted fields, preserving recorded announcement data about the incorporated switch that was previously stored in the database; and
        after recording the extracted fields,
            comparing the preserved recorded announcement data to the extracted fields,
            identifying portions of the preserved recorded announcement data that do not appear in the extracted fields, and
            entering the portions into the database.

2. The method of claim 1, wherein at least one of the one or more switches is a non-incorporated switch of a central office of a telecommunications network and the announcements provisioned from the switch are recorded announcements that are audible, and wherein collecting the switch data for the non-incorporated switch comprises collecting one of paper records and electronic records.

3. The method of claim 2, wherein extracting the recorded announcement data from the switch data comprises identifying data of the one or more switches that is relevant to assigning and maintaining recorded voice announcements.

4. The method of claim 2, wherein, for the paper records, storing the recorded announcement data in a database comprises typing the recorded announcement data in the database, and wherein, for the electronic records, storing the recorded announcement data in a database comprises loading the recorded announcement data in the database.

5. The method of claim 2, wherein the non-incorporated switch is one of a 5ESS switch and a 1EASS switch.

6. The method of claim 1, wherein the incorporated switch is a DMS switch.

7. The method of claim 1, wherein each switch is of a central office of a telecommunications network and the recorded announcement information is stored according to central office.

8. The method of claim 1, wherein providing one or more users with access to the database through a computer network comprises providing a graphical user interface through which the one or more users can view, search, and edit the announcement data.

9. The method of claim 2, wherein one or more central office switches contain one or more recorded announcement units, wherein the one or more recorded announcement units contain textual representations of one or more announcements, and wherein providing one or more users with access comprises displaying the one or more recorded announcement units and their textual representations of one or more announcements.

10. The method of claim 1, wherein collecting the switch data and extracting the announcement data from the switch data are periodically performed to ensure that the database contains up-to-date information.

11. The method of claim 1, further comprising associating announcements with recorded announcement equipment of selected central office switches.

12. The method of claim 1, further comprising displaying recorded announcement data associated with central offices that have available capacity.

13. The method of claim 1, wherein the announcement data includes characteristics pertaining to individual announcements, and wherein the method further comprises searching for characteristics pertaining to a particular announcement.

14. The method of claim 1, further comprising editing the announcement data in the database.

15. A method for managing recorded announcement data comprising:
- retrieving translation tables and a display of DRAM (Digital Recorder Announcement Module) from a central office switch;
- extracting recorded announcement data from the translation tables and display of DRAM, the recorded announcement data describing one or more characteristics of the central office switch that relate to the provisioning of recorded announcements from the switch;
- populating interim data tables with the recorded announcement data;
- building an inventory of data records of announcements from the interim data tables;
- creating associations between data fields of the inventory of data records of announcements;
- storing the inventory of data records of announcements on a server accessible to one or more users; and
- providing the one or more users with access to the server through a computer network to display a data record of announcements when selected by the one or more users;

wherein, before storing the inventory of data records of announcements, the method further comprises extracting existing data for the central office switch from the server and storing the existing data in a carry-over table, and wherein, after storing the inventory of data records of announcements on the server, the method further comprises comparing the inventory of data records of announcements to the carry-over table, identifying data that is present in the carry-over table and missing from the inventory of data records of announcements, and adding the missing data to the inventory of data records of announcements.

16. The method of claim 15, further comprising displaying recorded announcement data associated with central offices that have available capacity.

17. The method of claim 15, wherein the recorded announcement data includes characteristics pertaining to individual announcements, and wherein the method further comprises searching the inventory of data records of announcements for characteristics pertaining to a particular announcement.

18. The method of claim 1, wherein the one or more switches comprises a plurality of switches distributed throughout the communications network, wherein collecting the switch data comprises collected switch data from multiple switches of the plurality, and wherein storing the announcement data in the database comprises storing announcement data from multiples switches of the plurality in the same database.

* * * * *